United States Patent
Strohmann et al.

(10) Patent No.: US 11,087,109 B1
(45) Date of Patent: Aug. 10, 2021

(54) APPARATUS AND METHOD FOR ULTRASONIC FINGERPRINT AND FORCE SENSING

(71) Applicant: QUALCOMM Incorporated, San Diego, CA (US)

(72) Inventors: Jessica Liu Strohmann, Cupertino, CA (US); Mowen Yang, Sunnyvale, CA (US); Jae Hyeong Seo, Pleasanton, CA (US); Jorge Adrian Madrigal Ramirez, San Jose, CA (US); Kostadin Dimitrov Djordjev, Los Gatos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/940,285

(22) Filed: Jul. 27, 2020

(51) Int. Cl.
  *G06K 9/00* (2006.01)
  *G06K 9/03* (2006.01)
  *G06F 3/043* (2006.01)

(52) U.S. Cl.
  CPC ............ *G06K 9/0002* (2013.01); *G06F 3/043* (2013.01); *G06K 9/036* (2013.01)

(58) Field of Classification Search
  None
  See application file for complete search history.

(56) References Cited

U.S. PATENT DOCUMENTS

| | | | |
|---|---|---|---|
| 2008/0166028 A1* | 7/2008 | Turek | G06K 9/0002 382/124 |
| 2019/0354738 A1* | 11/2019 | Baek | G06F 1/163 |
| 2020/0184177 A1* | 6/2020 | Liu | B06B 1/0292 |

* cited by examiner

*Primary Examiner* — Joseph R Haley
(74) *Attorney, Agent, or Firm* — Weaver Austin Villeneuve & Sampson LLP

(57) ABSTRACT

A method may involve estimating a force applied by a target object on a surface, determining at least one ultrasonic fingerprint sensor parameter modification based, at least in part, on the force and updating at least one setting of an ultrasonic fingerprint sensor based, at least in part, on the ultrasonic fingerprint sensor parameter modification. The method may involve controlling the ultrasonic fingerprint sensor to transmit first and second ultrasonic waves towards the target object and receiving first and second ultrasonic receiver signals, including signals corresponding to reflections of the first and second ultrasonic waves from the target object, from the ultrasonic fingerprint sensor. The method may involve performing an authentication process based, at least in part, on the first and second ultrasonic receiver signals.

36 Claims, 19 Drawing Sheets

Light Touch

Heavy Touch

Dry Finger

APPARATUS AND METHOD FOR ULTRASONIC FINGERPRINT AND FORCE SENSING

TECHNICAL FIELD

This disclosure relates generally to ultrasonic fingerprint sensors and methods for using such systems.

DESCRIPTION OF THE RELATED TECHNOLOGY

Ultrasonic fingerprint sensors have been included in devices such as smartphones, cash machines and cars to authenticate a user. Although some existing ultrasonic fingerprint sensors can provide satisfactory performance, improved ultrasonic fingerprint sensors would be desirable.

SUMMARY

The systems, methods and devices of the disclosure each have several innovative aspects, no single one of which is solely responsible for the desirable attributes disclosed herein.

One innovative aspect of the subject matter described in this disclosure may be implemented in an apparatus. The apparatus may include an ultrasonic fingerprint sensor and a control system that is configured for communication with the ultrasonic fingerprint sensor. In some examples, at least a portion of the control system may be coupled to the ultrasonic fingerprint sensor. In some implementations, a mobile device may be, or may include, the apparatus. For example, a mobile device may include an apparatus as disclosed herein. In some examples, the apparatus may include a force sensor.

According to some examples, the control system may be configured for controlling the ultrasonic fingerprint sensor for transmission of first ultrasonic waves towards a target object in contact with a surface. The surface may be an ultrasonic fingerprint sensor surface or a surface of a device proximate an area in which the ultrasonic fingerprint sensor resides. In some examples, the control system may be configured for receiving first ultrasonic receiver signals from the ultrasonic fingerprint sensor. The first ultrasonic receiver signals may include signals corresponding to reflections of the first ultrasonic waves from the target object.

According to some implementations, the control system may be configured for obtaining an estimation of a force applied by the target object on the surface. In some examples, the control system may be configured for determining at least one ultrasonic fingerprint sensor parameter modification based, at least in part, on the force. According to some examples, the control system may be configured for updating at least one setting of the ultrasonic fingerprint sensor based, at least in part, on the ultrasonic fingerprint sensor parameter modification.

In some examples, the control system may be configured for controlling the ultrasonic fingerprint sensor for transmission of second ultrasonic waves towards the target object. In some implementations, the control system may be configured for receiving second ultrasonic receiver signals from the ultrasonic fingerprint sensor. The second ultrasonic receiver signals may include signals corresponding to reflections of the second ultrasonic waves from the target object. According to some implementations, the control system may be configured for performing an authentication process based, at least in part, on the first ultrasonic receiver signals and the second ultrasonic receiver signals. In some instances, the apparatus may be integrated into a mobile device.

In some instances, the at least one ultrasonic fingerprint sensor parameter modification may include a gain value modification, a modification of a frequency of a transmitted ultrasonic wave, a range gate delay modification, a range gate window modification and/or a modification of a bias condition. According to some implementations, determining the at least one ultrasonic fingerprint sensor parameter modification may involve obtaining at least one new ultrasonic fingerprint sensor parameter from a portion of a data structure corresponding to the force. The data structure may, for example, include force values and corresponding ultrasonic fingerprint sensor parameters.

In some examples, the estimation of the force may be based, at least in part, on analysis of the first ultrasonic receiver signals. According to some implementations, the estimation of the force may be based, at least in part, on analysis of a first fingerprint image corresponding to the first ultrasonic receiver signals. In some such implementations, the estimation of the force may be based on a contact area, a void to ridge ratio and/or a ridge distance of the first fingerprint image.

According to some implementations, the apparatus may include a force sensor. In some such examples, the estimation of the force may be based, at least in part, on force sensor signals received from the force sensor. In some such implementations, the force sensor may be integrated into circuitry of the ultrasonic fingerprint sensor. However, in other implementations the force sensor may be separate from the ultrasonic fingerprint sensor. In some examples, the force sensor may include, or may be, a piezo-resistive sensor, a capacitive sensor and/or a polymer-based thin film sensor. In some such implementations, the piezo-resistive sensor may include silicon, metal, polysilicon and/or glass.

In some examples, the control system may be further configured for performing an anti-spoofing process that may be based, at least in part, on the force. In some such implementations, the anti-spoofing process may also be based, at least in part, on a first fingerprint image corresponding to the first ultrasonic receiver signals and/or on a second fingerprint image corresponding to the second ultrasonic receiver signals. According to some examples, the anti-spoofing process may involve a process of estimating a target object material property.

According to some implementations, the control system may be configured for estimating a first force corresponding to the first ultrasonic receiver signals and estimating a second force corresponding to the second ultrasonic receiver signals. In some such implementations, the apparatus may include, or may be configured for communication with, a display. In some such implementations, the control system may be further configured for controlling the display to provide a prompt to apply a different force after estimating the first force.

In some implementations, the ultrasonic fingerprint sensor may include an electrode layer proximate an ultrasonic transmitter layer. In some such implementations, the first ultrasonic receiver signals may be obtained via the electrode layer. The estimation of the force may be based, at least in part, on analysis of the first ultrasonic receiver signals.

Other innovative aspects of the subject matter described in this disclosure may be implemented in a method of controlling an ultrasonic fingerprint sensor. In some examples, the method may involve controlling the ultrasonic fingerprint sensor for transmission of first ultrasonic waves towards a target object in contact with a surface. The surface may be an ultrasonic fingerprint sensor surface or a surface of a device proximate an area in which the ultrasonic fingerprint sensor resides. In some instances, the method may involve receiving first ultrasonic receiver signals from the ultrasonic fingerprint sensor, the first ultrasonic receiver signals may include signals corresponding to reflections of the first ultrasonic waves from the target object.

In some examples, the method may involve obtaining an estimation of a force applied by the target object on the surface. In some instances, the method may involve determining at least one ultrasonic fingerprint sensor parameter modification based, at least in part, on the force. The method may involve updating at least one setting of the ultrasonic fingerprint sensor based, at least in part, on the ultrasonic fingerprint sensor parameter modification.

In some instances, the method may involve controlling the ultrasonic fingerprint sensor for transmission of second ultrasonic waves towards the target object. In some examples, the method may involve receiving second ultrasonic receiver signals from the ultrasonic fingerprint sensor. The second ultrasonic receiver signals may include signals corresponding to reflections of the second ultrasonic waves from the target object. In some instances, the method may involve performing an authentication process based, at least in part, on the first ultrasonic receiver signals and the second ultrasonic receiver signals.

According to some examples, the at least one ultrasonic fingerprint sensor parameter modification may include a gain value modification, a modification of a frequency of a transmitted ultrasonic wave, a range gate delay modification, a range gate window modification and/or a modification of a bias condition. In some examples, determining the at least one ultrasonic fingerprint sensor parameter modification may involve obtaining at least one new ultrasonic fingerprint sensor parameter from a portion of a data structure corresponding to the force. The data structure may, for example, include force values and corresponding ultrasonic fingerprint sensor parameters.

In some examples, the estimation of the force may be based, at least in part, on analysis of the first ultrasonic receiver signals. According to some implementations, the estimation of the force may be based, at least in part, on analysis of a first fingerprint image corresponding to the first ultrasonic receiver signals. In some such implementations, the estimation of the force may be based on a contact area, a void to ridge ratio and/or a ridge distance of the first fingerprint image. In some implementations, the estimation of the force may be based, at least in part, on force sensor signals received from a force sensor.

In some instances, the method may involve performing an anti-spoofing process that may be based, at least in part, on the force. In some such examples, the anti-spoofing process may be also based, at least in part, on a first fingerprint image corresponding to the first ultrasonic receiver signals and/or a second fingerprint image corresponding to the second ultrasonic receiver signals. In some such examples, the anti-spoofing process may involve a process of estimating a target object material property.

In some instances, the method may involve estimating a first force corresponding to the first ultrasonic receiver signals and estimating a second force corresponding to the second ultrasonic receiver signals. In some such examples, the method may involve controlling a display and/or a speaker to provide a prompt to apply a different force after estimating the first force. In some examples, the ultrasonic fingerprint sensor may be integrated into a mobile device.

Some or all of the operations, functions and/or methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. Accordingly, some innovative aspects of the subject matter described in this disclosure can be implemented in one or more non-transitory media having software stored thereon.

For example, the software may include instructions for controlling one or more devices to perform a method of controlling an ultrasonic fingerprint sensor. In some examples, the method may involve controlling the ultrasonic fingerprint sensor for transmission of first ultrasonic waves towards a target object in contact with a surface. The surface may be an ultrasonic fingerprint sensor surface or a surface of a device proximate an area in which the ultrasonic fingerprint sensor resides. In some instances, the method may involve receiving first ultrasonic receiver signals from the ultrasonic fingerprint sensor, the first ultrasonic receiver signals may include signals corresponding to reflections of the first ultrasonic waves from the target object.

In some instances, the method may involve obtaining an estimation of a force applied by the target object on the surface. In some instances, the method may involve determining at least one ultrasonic fingerprint sensor parameter modification based, at least in part, on the force. In some examples, the method may involve updating at least one setting of the ultrasonic fingerprint sensor based, at least in part, on the ultrasonic fingerprint sensor parameter modification.

In some examples, the method may involve controlling the ultrasonic fingerprint sensor for transmission of second ultrasonic waves towards the target object. The method may involve receiving second ultrasonic receiver signals from the ultrasonic fingerprint sensor. The second ultrasonic receiver signals may include signals corresponding to reflections of the second ultrasonic waves from the target object. In some instances, the method may involve performing an authentication process based, at least in part, on the first ultrasonic receiver signals and the second ultrasonic receiver signals.

According to some examples, the at least one ultrasonic fingerprint sensor parameter modification may include a gain value modification, a modification of a frequency of a transmitted ultrasonic wave, a range gate delay modification, a range gate window modification and/or a modification of a bias condition. In some examples, determining the at least one ultrasonic fingerprint sensor parameter modification may involve obtaining at least one new ultrasonic fingerprint sensor parameter from a portion of a data structure corresponding to the force. The data structure may, for example, include force values and corresponding ultrasonic fingerprint sensor parameters.

In some examples, the estimation of the force may be based, at least in part, on analysis of the first ultrasonic receiver signals. According to some implementations, the estimation of the force may be based, at least in part, on analysis of a first fingerprint image corresponding to the first ultrasonic receiver signals. In some such implementations, the estimation of the force may be based on a contact area, a void to ridge ratio and/or a ridge distance of the first fingerprint image. In some implementations, the estimation of the force may be based, at least in part, on force sensor signals received from a force sensor.

In some instances, the method may involve performing an anti-spoofing process that may be based, at least in part, on the force. In some such examples, the anti-spoofing process may be also based, at least in part, on a first fingerprint image corresponding to the first ultrasonic receiver signals and/or a second fingerprint image corresponding to the second ultrasonic receiver signals. In some such examples, the anti-spoofing process may involve a process of estimating a target object material property.

In some instances, the method may involve estimating a first force corresponding to the first ultrasonic receiver signals and estimating a second force corresponding to the second ultrasonic receiver signals. In some such examples, the method may involve controlling a display and/or a speaker to provide a prompt to apply a different force after estimating the first force. In some examples, the ultrasonic fingerprint sensor may be integrated into a mobile device.

BRIEF DESCRIPTION OF THE DRAWINGS

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale. Like reference numbers and designations in the various drawings indicate like elements.

DETAILED DESCRIPTION

Figure 1A:
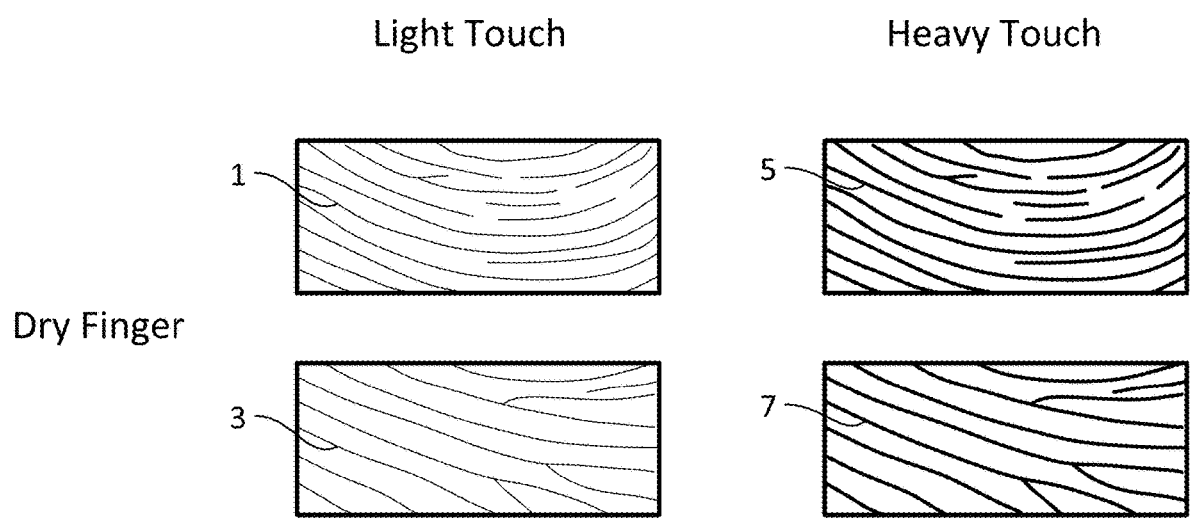
FIG. 1A shows examples of fingerprint images obtained from a dry finger by an ultrasonic fingerprint sensor.

The following description is directed to certain implementations for the purposes of describing the innovative aspects of this disclosure. However, a person having ordinary skill in the art will readily recognize that the teachings herein may be applied in a multitude of different ways. The described implementations may be implemented in any device, apparatus, or system that includes a biometric system as disclosed herein. In addition, it is contemplated that the described implementations may be included in or associated with a variety of electronic devices such as, but not limited to: mobile telephones, multimedia Internet enabled cellular telephones, mobile television receivers, wireless devices, smartphones, smart cards, wearable devices such as bracelets, armbands, wristbands, rings, headbands, patches, etc., Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (e.g., e-readers), mobile health devices, computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, automatic teller machines (ATMs), parking meters, packaging (such as in electromechanical systems (EMS) applications including microelectromechanical systems (MEMS) applications, as well as non-EMS applications), aesthetic structures (such as display of images on a piece of jewelry or clothing) and a variety of EMS devices. The teachings herein also may be used in applications such as, but not limited to, electronic switching devices, radio frequency filters, sensors, accelerometers, gyroscopes, motion-sensing devices, magnetometers, inertial components for consumer electronics, parts of consumer electronics products, automobile doors, steering wheels or other automobile parts, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

Poor coupling of the finger to the platen of an ultrasonic fingerprint sensor is a common problem. (As used herein, the term "finger" can refer to any digit, including a thumb. Accordingly, the term "fingerprint" as used herein may refer to a print from any digit, including a thumb.) Poor coupling can occur when the finger is dry and/or when low finger pressure is applied.

In some implementations, an apparatus may include an ultrasonic fingerprint sensor and a control system. According to some examples, the apparatus may be configured for measuring, and/or obtaining an estimation of, a force applied by the target object on the surface. The control system may be configured for determining at least one ultrasonic fingerprint sensor parameter modification based, at least in part, on the force and for updating at least one setting of the ultrasonic fingerprint sensor based, at least in part, on the ultrasonic fingerprint sensor parameter modification.

In some such examples, the force estimation may be based at least in part on an analysis of ultrasonic receiver signals reflected from the target object. Alternatively, or additionally, the apparatus may include a force sensor. In some examples, the force sensor may be integrated into circuitry of the ultrasonic fingerprint sensor. In other examples, the force sensor may be separate from the ultrasonic fingerprint sensor.

Particular implementations of the subject matter described in this disclosure may be implemented to realize one or more of the following potential advantages. According to some examples, updating one or more settings of the ultrasonic fingerprint sensor may compensate for the loss of image quality that would otherwise normally occur when the target object is lightly touching the surface. For example, modifying a gain value, a frequency of a transmitted ultrasonic wave, a range gate delay, a range gate window and/or a bias condition may compensate for the light touch.

According to experiments conducted by the present inventors, the image quality of fingerprint images obtained via an ultrasonic fingerprint sensor generally increases according to the force with which the imaged finger is pressed against the outer surface of the ultrasonic fingerprint sensor, or against the outer surface of a device that includes the ultrasonic fingerprint sensor. However, a dry finger generally needs to be pressed against the surface with a relatively larger force to obtain the same fingerprint image quality as a fingerprint image obtained from a normal finger. In some examples, the dry finger would need to be pressed against the surface with about three times the force in order to obtain the same fingerprint image quality as a fingerprint image obtained from a normal finger.

FIG. 1A shows examples of fingerprint images obtained from a dry finger by an ultrasonic fingerprint sensor. In these examples, image 1 and image 5 are from the same portion of the finger. Image 3 and image 7 both correspond to another portion of the finger. Images 1 and 3 were obtained when the finger was lightly touching the surface of the ultrasonic fingerprint sensor, whereas images 5 and 7 were obtained when the finger was pressed against the surface of the ultrasonic fingerprint sensor with a relatively larger force. In these examples, the light touches correspond to approximately 30 gram-force and the heavier touches correspond to 100 gram-force or more.

Figure 1B:
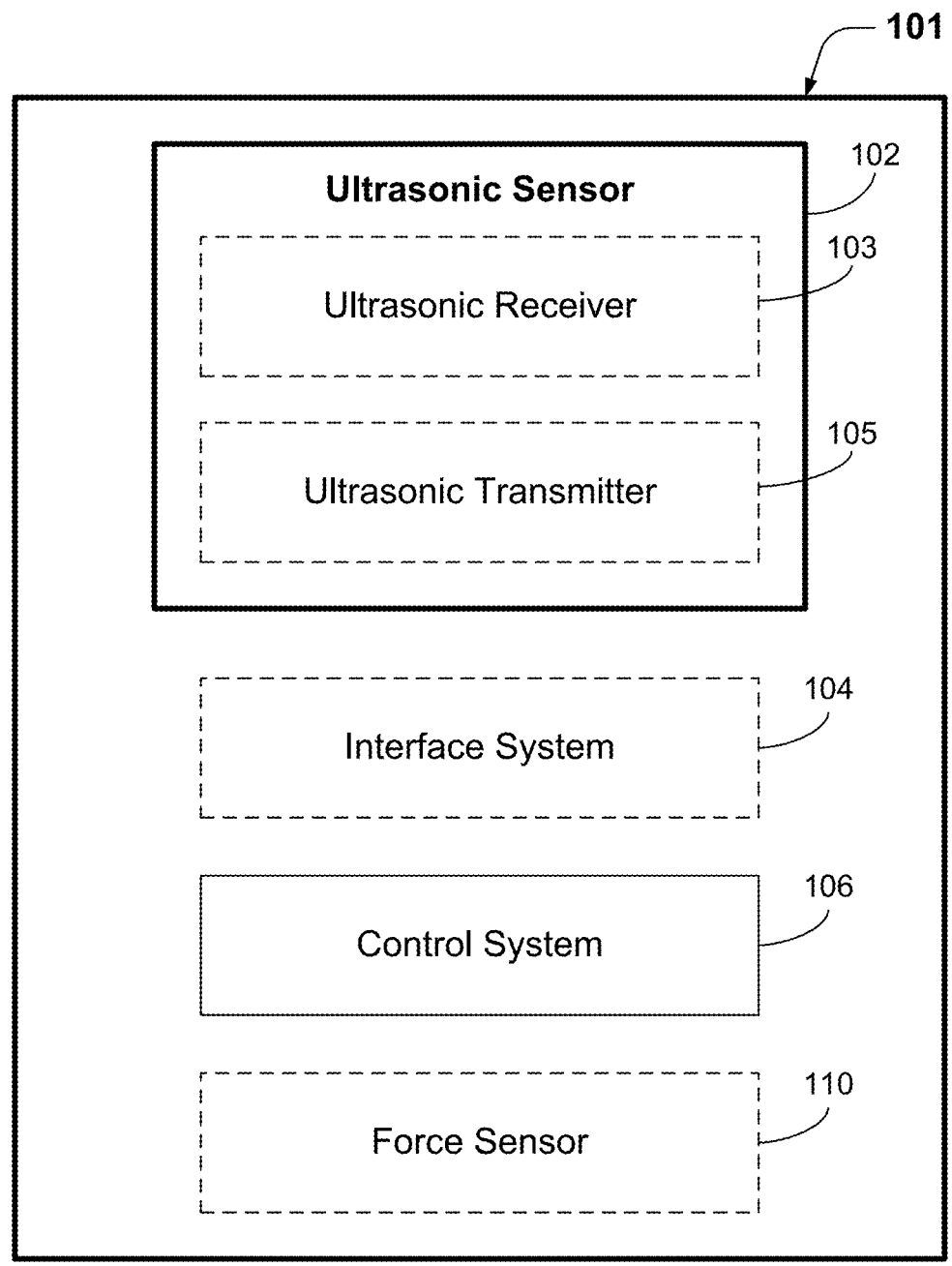
FIG. 1B is a block diagram that shows example components of an apparatus according to some disclosed implementations.

FIG. 1B is a block diagram that shows example components of an apparatus according to some disclosed implementations. In this example, the apparatus 101 includes an ultrasonic fingerprint sensor 102 and a control system 106. Some implementations of the apparatus 101 may include an interface system 104 and/or a force sensor 110.

In some examples, as suggested by the dashed lines within the ultrasonic fingerprint sensor 102, the ultrasonic fingerprint sensor 102 may include an ultrasonic receiver 103 and a separate ultrasonic transmitter 105. In some such examples, the ultrasonic transmitter 105 may include an ultrasonic plane-wave generator, such as those described below.

However, various examples of ultrasonic fingerprint sensors 102 are disclosed herein, some of which may include a separate ultrasonic transmitter 105 and some of which may not. Although shown as separate elements in FIG. 1B, in some implementations the ultrasonic receiver 103 and the ultrasonic transmitter 105 may be combined in an ultrasonic transceiver system. For example, in some implementations, the ultrasonic fingerprint sensor 102 may include a piezoelectric receiver layer, such as a layer of polyvinylidene fluoride (PVDF) polymer or a layer of polyvinylidene fluoride-trifluoroethylene (PVDF-TrFE) copolymer. In some implementations, a separate piezoelectric layer may serve as the ultrasonic transmitter. In some implementations, a single piezoelectric layer may serve as both a transmitter and a receiver. In some implementations that include a piezoelectric layer, other piezoelectric materials may be used in the piezoelectric layer, such as aluminum nitride (AlN) or lead zirconate titanate (PZT). The ultrasonic fingerprint sensor 102 may, in some examples, include an array of ultrasonic transducer elements, such as an array of piezoelectric micromachined ultrasonic transducers (PMUTs), an array of capacitive micromachined ultrasonic transducers (CMUTs), etc. In some such examples, PMUT elements in a single-layer array of PMUTs or CMUT elements in a single-layer array of CMUTs may be used as ultrasonic transmitters as well as ultrasonic receivers.

The force sensor 110, if present in the apparatus 101, may be a piezo-resistive sensor, a capacitive sensor, a thin film sensor (e.g., a polymer-based thin film sensor), or another type of suitable force sensor. If the force sensor 110 includes a piezo-resistive sensor, the piezo-resistive sensor may include silicon, metal, polysilicon and/or glass. The ultrasonic fingerprint sensor 102 and the force sensor 110 may, in some instances, be mechanically coupled. In some such examples, the force sensor 110 may be integrated into circuitry of the ultrasonic fingerprint sensor 102. However, in other implementations the force sensor 110 may be separate from the ultrasonic fingerprint sensor 102. The ultrasonic fingerprint sensor 102 and the force sensor 110 may, in some examples, be indirectly coupled. For example, the ultrasonic fingerprint sensor 102 and the force sensor 110 each may be coupled to a portion of the apparatus 101. In some such examples, the ultrasonic fingerprint sensor 102 and the force sensor 110 each may be coupled to a portion of the control system.

The control system 106 may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. According to some examples, the control system 106 may include a dedicated component for controlling the ultrasonic fingerprint sensor 102 and/or the force sensor 110. The control system 106 also may include (and/or be configured for communication with) one or more memory devices, such as one or more random access memory (RAM) devices, read-only memory (ROM) devices, etc. Accordingly, the apparatus 101 may have a memory system that includes one or more memory devices, though the memory system is not shown in FIG. 1B. The control system 106 may be configured for receiving and processing data from the ultrasonic fingerprint sensor 102, e.g., from the ultrasonic receiver 103. If the apparatus 101 includes a separate ultrasonic transmitter 105, the control system 106 may be configured for controlling the ultrasonic transmitter 105, e.g., as disclosed elsewhere herein. In some implementations, functionality of the control system 106 may be partitioned between one or more controllers or processors, such as between a dedicated sensor controller and an applications processor of a mobile device. Some examples are described below.

Some implementations of the apparatus 101 may include an interface system 104. In some examples, the interface system 104 may include a wireless interface system. In some implementations, the interface system 104 may include a user interface system, one or more network interfaces, one or more interfaces between the control system 106 and a memory system, and/or one or more interfaces between the control system 106 and one or more external device interfaces (e.g., ports or applications processors).

The interface system 104 may be configured to provide communication (which may include wired or wireless communication, such as electrical communication, radio communication, etc.) between components of the apparatus 101. In some such examples, the interface system 104 may be configured to provide communication between the control system 106 and the ultrasonic fingerprint sensor 102, and between the control system 106 and the force sensor 110. According to some such examples, the interface system 104 may couple at least a portion of the control system 106 to the ultrasonic fingerprint sensor 102 and the force sensor 110, e.g., via electrically conducting material (e.g., via conductive metal wires or traces. If the apparatus 101 includes an ultrasonic transmitter 105 that is separate from the ultrasonic receiver 103, the interface system 104 may be configured to provide communication between at least a portion of the control system 106 and the ultrasonic transmitter 105. According to some examples, the interface system 104 may be configured to provide communication between the apparatus 101 and other devices and/or human beings. In some such examples, the interface system 104 may include one or more user interfaces. The interface system 104 may, in some examples, include one or more network interfaces and/or one or more external device interfaces (such as one or more universal serial bus (USB) interfaces or a serial peripheral interface (SPI)). In some implementations, the apparatus 101 may include a memory system. The interface system 104 may, in some examples, include at least one interface between the control system 106 and a memory system.

The apparatus 101 may be used in a variety of different contexts, some examples of which are disclosed herein. For example, in some implementations a mobile device may include at least a portion of the apparatus 101. In some implementations, a wearable device may include at least a portion of the apparatus 101. The wearable device may, for example, be a bracelet, an armband, a wristband, a ring, a headband or a patch. In some implementations, the control system 106 may reside in more than one device. For example, a portion of the control system 106 may reside in a wearable device and another portion of the control system 106 may reside in another device, such as a mobile device (e.g., a smartphone). The interface system 104 also may, in some such examples, reside in more than one device.

Figure 2A:
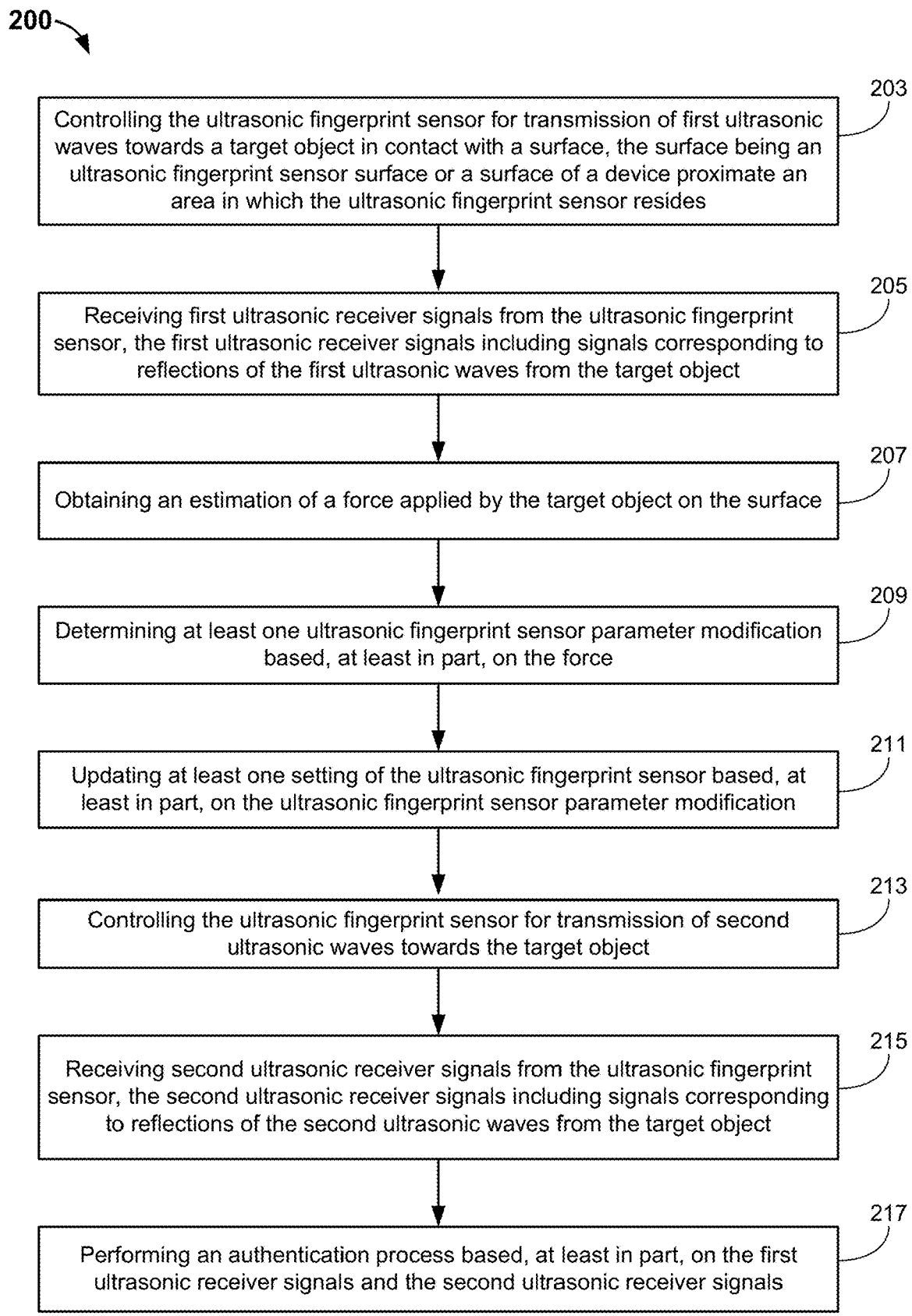
FIG. 2A is a flow diagram that provides example blocks of some methods disclosed herein.

FIG. 2A is a flow diagram that provides example blocks of some methods disclosed herein. The blocks of FIG. 2A may, for example, be performed by the apparatus 101 of FIG. 1B or by a similar apparatus. As with other methods disclosed herein, the method 200 outlined in FIG. 2A may include more or fewer blocks than indicated. Moreover, the blocks of methods disclosed herein are not necessarily performed in the order indicated. In some examples, some blocks of methods disclosed herein may be performed concurrently.

According to this example, the method 200 is a method of controlling an apparatus that includes an ultrasonic fingerprint sensor. According to this implementation, block 203 involves controlling (e.g., via a control system of the apparatus, such as the control system 106 of the apparatus 101 that is shown in FIG. 1B), the ultrasonic fingerprint sensor for transmission of first ultrasonic waves towards a target object in contact with a surface. The surface may be an ultrasonic fingerprint sensor surface or a surface of a device proximate an area in which the ultrasonic fingerprint sensor resides.

In some examples, block 203 may involve controlling the ultrasonic fingerprint sensor to transmit ultrasonic waves in the range of 1 MHz to 30 MHz. For example, an ultrasonic transmitter of the ultrasonic fingerprint sensor may be controlled for transmission of the first ultrasonic waves.

According to some examples, the apparatus may include a touch sensor system. In some such examples, a previous process of the method 200 may have involved determining, by a control system, a target object position based on one or more signals received from the touch sensor system. Block 203 may, in some such examples, involve controlling the ultrasonic fingerprint sensor according to the digit position. However, in some alternative examples, the control system may be configured for determining a digit position based on one or more signals received from the ultrasonic fingerprint sensor and/or from a force sensor.

In this implementation, block 205 involves receiving first ultrasonic receiver signals from the ultrasonic fingerprint sensor. The first ultrasonic receiver signals include signals corresponding to reflections of the first ultrasonic waves from the target object.

According to this implementation, block 207 involves obtaining an estimation of a force applied by the target object on the surface of the apparatus, or a surface of a device that includes the apparatus. In this example a control system of the apparatus is configured for obtaining the force estimation. The apparatus may or may not include a force sensor, depending on the particular implementation. If the apparatus includes a force sensor, the force estimation may be based on force sensor signals received from a force sensor.

In some examples (e.g., examples in which the apparatus does not include a force sensor), the force estimation may be based, at least in part, on analysis of the first ultrasonic receiver signals. In some instances, the force estimation may be based, at least in part, on analysis of a first fingerprint image corresponding to the first ultrasonic receiver signals. The force estimation may be based, for example, on a contact area of the target object (e.g. a contact area of a finger), a void-to-ridge ratio and/or a ridge distance of the first fingerprint image. Some examples are disclosed herein and described below.

In this example, block 209 involves determining at least one ultrasonic fingerprint sensor parameter modification based, at least in part, on the force. According to some examples, block 209 may involve determining the ultrasonic fingerprint sensor parameter modification(s) based, at least in part, on one or more other factors. Such factors may include, but are not limited to, the quality of an image corresponding to the first ultrasonic receiver signals. In some examples, block 209 may involve determining an image quality score based on one or more image quality metrics. In some examples, the image quality metrics may be based, at least in part, on contrast. According to some examples, the image quality metrics may be based, at least in part, on signal-to-noise ratio. In some implementations, the image quality metrics may be based, at least in part, on the mean and/or the standard deviation of the signal amplitude. In some examples, the image quality metrics may be based, at least in part, on the skewness and/or the kurtosis of the signal. In some implementations, the image quality metrics may be based on all of the foregoing parameters. According to some such examples, block 209 may involve determining the ultrasonic fingerprint sensor parameter modification(s) based, at least in part, on whether the image quality score is less than a threshold value and/or on the difference between a threshold value and the image quality score. Here, block 211 involves updating at least one setting of the ultrasonic fingerprint sensor based, at least in part, on the ultrasonic fingerprint sensor parameter modification.

The ultrasonic fingerprint sensor parameter modification(s) may include a gain value modification, a modification of a frequency of a transmitted ultrasonic wave, a range gate delay modification, a range gate window modification and/or a modification of a bias condition. Examples of these parameters are described below with reference to corresponding figures. According to some examples, determining the ultrasonic fingerprint sensor parameter modification(s) may involve obtaining one or more new ultrasonic fingerprint sensor parameters from a data structure. For example, determining the ultrasonic fingerprint sensor parameter modification(s) may involve obtaining one or more new ultrasonic fingerprint sensor parameters from a portion of a data structure corresponding to the force. The data structure may include force values and corresponding ultrasonic fingerprint sensor parameters.

TABLE 1

| Force | VBOOST | DBIAS | Integration Time | RGD | RGW |
|---|---|---|---|---|---|
| 1N | 25 V | 6.5 V | 1.5 us | 1.25 us | 0.02 us |

Table 1 provides a simple example of a portion of one such data structure. In Table 1, examples of ultrasonic fingerprint sensor parameters corresponding to a force of 1 Newton are shown, including a voltage boost (VBOOST) of 25 Volts, a bias Voltage (DBIAS) of 6.5 Volts, an integration time of 1.5 microseconds, a range-gate delay (RGD) of 1.25 microseconds and a range gate window (RGW) of 0.02 microseconds. The meanings of the terms DBIAS, RGD and RGW, along with illustrative examples, are discussed below with reference to FIG. 6 et seq. "Integration time" corresponds to the time period in which pixel is enabled to sense for each tone burst. It is a good indicator of the system latency. The voltage boost VBOOST refers to the boost voltage applied to the transmitter.

In this example, block 213 involves controlling the ultrasonic fingerprint sensor for transmission of second ultrasonic waves towards the target object. According to this implementation, block 215 involves receiving second ultrasonic receiver signals from the ultrasonic fingerprint sensor. Here, the second ultrasonic receiver signals include signals corresponding to reflections of the second ultrasonic waves from the target object.

According to this example, block 217 involves performing an authentication process based, at least in part, on the first ultrasonic receiver signals received in block 205 and the second ultrasonic receiver signals received in block 215. In some instances, block 217 may involve obtaining fingerprint image data corresponding to the signals. As used herein, the term "fingerprint image data" may refer generally to data obtained from, or data based on signals obtained from, an ultrasonic receiver. In some instances, the fingerprint image data may correspond, at least in part, to a target object such as a finger that may include a fingerprint. The fingerprint image data may or may not be presented in a form that is recognizable to a human being as being an image. For example, the fingerprint image data may be, or may include, a data structure in which numerical values are arranged and/or stored. The numerical values may, in some examples, correspond to signals received from an ultrasonic fingerprint sensor, an optical sensor system, a capacitive sensor system, etc. In some examples, the fingerprint image data may correspond to signals received from a sensor system during a time window. In some instances, the fingerprint image data may correspond to signals received from a particular area, such as a fingerprint contact area.

In some examples, block 217 may involve extracting features from the ultrasonic receiver signals. The authentication process may be based, at least in part, on the features. According to some examples, the features may be fingerprint features, such as the locations, orientations and/or types of fingerprint minutiae. In some such examples, the fingerprint image data may include indications of one or more fingerprint features detected in at least a portion of the signals from the sensor system (such as an ultrasonic fingerprint sensor). The fingerprint features may include one or more fingerprint ridge features and one or more fingerprint valley features. The fingerprint features may, for example, be detected by a control system such as the control system 106 of FIG. 1B.

Signals indicating fingerprint ridge features may generally be obtained from sensor pixels of the ultrasonic fingerprint sensor that are responding to ultrasonic waves that have been reflected from platen/fingerprint ridge interfaces. Signals indicating fingerprint valley features may generally be obtained from sensor pixels that are responding to ultrasonic waves that have been reflected from platen/fingerprint valley interfaces. The reflections from a platen/fingerprint valley interface will generally be reflections from a platen/air interface, whereas the reflections from a platen/fingerprint ridge interface will generally be reflections from a platen/skin interface, corresponding to areas in which fingerprint ridges are in contact with a platen. Because a platen/fingerprint valley interface will generally have a much higher acoustic impedance contrast than a platen/fingerprint ridge interface, a platen/fingerprint valley interface will generally produce relatively higher-amplitude reflections.

Figure 2B:
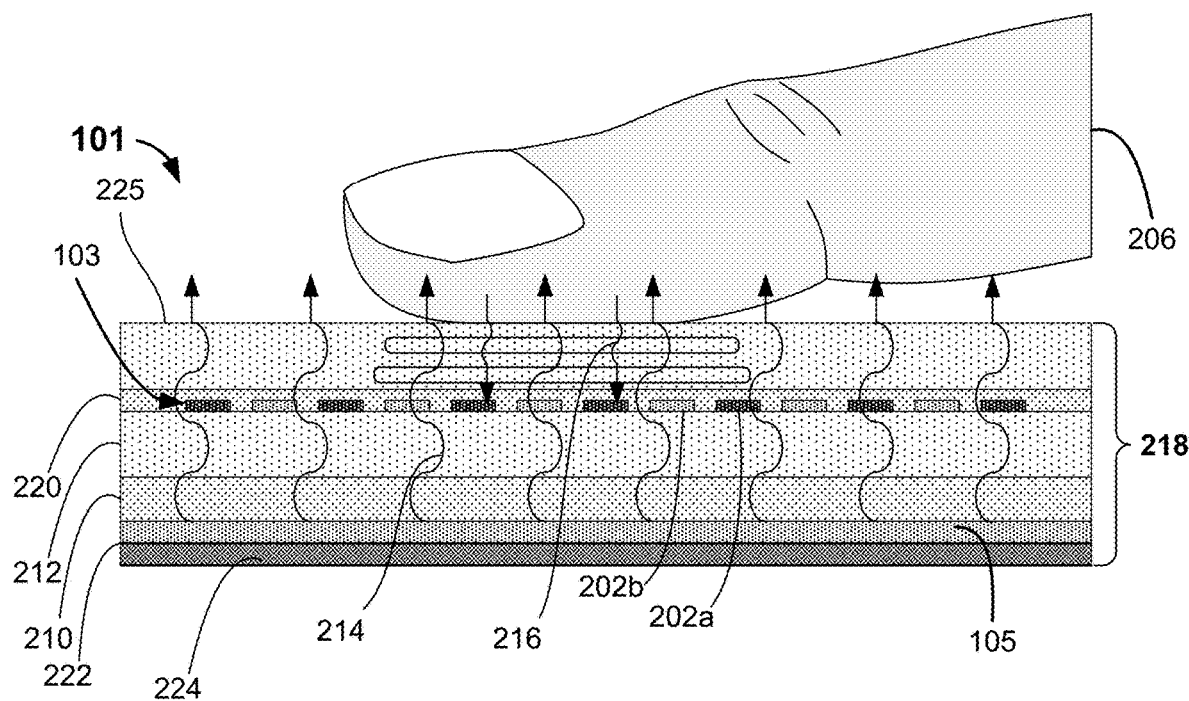
FIG. 2B shows an example of a cross-sectional view of an apparatus capable of performing at least some methods that are described herein.

FIG. 2B shows an example of a cross-sectional view of an apparatus capable of performing at least some methods that are described herein. For example, the apparatus 101 may be capable of performing the methods that are described herein with reference to FIG. 2A. Here, the apparatus 101 is an example of the apparatus 101 that is described above with reference to FIG. 1B. As with other implementations shown and described herein, the types of elements, the arrangement of the elements and the dimensions of the elements illustrated in FIG. 2B are merely shown by way of example.

FIG. 2B shows an example of ultrasonic waves reflecting from a target object. In this example, the target object is a finger 206 being insonified by transmitted ultrasonic waves 214. In this example, the transmitted ultrasonic waves 214 are instances of the first ultrasonic waves and second ultrasonic waves that are described above with reference to 203 and 213 of FIG. 2A. Here, the reflected ultrasonic waves 216 that are received by at least a portion of the ultrasonic receiver 103 are instances of the reflections of the first ultrasonic waves and the second ultrasonic waves from the target object that are described above with reference to 205 and 217 of FIG. 2A.

In this example, the ultrasonic waves are transmitted by an ultrasonic transmitter 105 that is separate from the ultrasonic receiver 103. In the example shown in FIG. 2B, at least a portion of the apparatus 101 includes an ultrasonic transmitter 105 that may function as a plane-wave ultrasonic transmitter. In some implementations, the ultrasonic transmitter 105 may include a piezoelectric transmitter layer with transmitter excitation electrodes disposed on each side of the piezoelectric transmitter layer. In some examples, the ultrasonic transmitter 105 may be, or may include, a piezoelectric layer, such as a layer of PVDF polymer or a layer of PVDF-TrFE copolymer. In this example, an electrode layer 222 resides between the ultrasonic transmitter 105 and a passivation layer 224. According to some examples, a control system (not shown in FIG. 2B), such as the control system 106 of FIG. 1B, may control the ultrasonic transmitter 105 according to electrical signals provided via the electrode layer 222.

In this example, the ultrasonic receiver 103 functions as an ultrasonic receiver array. In some such examples, the ultrasonic receiver 103 may include an array of pixel input electrodes and sensor pixels formed in part from TFT circuitry, an overlying piezoelectric receiver layer 220 of piezoelectric material such as PVDF or PVDF-TrFE, and an upper electrode layer positioned on the piezoelectric receiver layer, which will sometimes be referred to herein as a receiver bias electrode. Examples of suitable ultrasonic transmitters and ultrasonic receiver arrays are described below.

However, in alternative implementations, the ultrasonic receiver 103 and the ultrasonic transmitter 105 may be combined in an ultrasonic transceiver array. For example, in some implementations, the ultrasonic sensor 102 may include a piezoelectric receiver layer, such as a layer of PVDF polymer or a layer of PVDF-TrFE copolymer. In some implementations, a separate piezoelectric layer may serve as the ultrasonic transmitter. In some examples, a single piezoelectric layer may serve as the transmitter and as a receiver. In some implementations, other piezoelectric materials may be used in the piezoelectric layer, such as aluminum nitride (AlN) or lead zirconate titanate (PZT). The ultrasonic sensor 102 may, in some examples, include an array of ultrasonic transducer elements, such as an array of piezoelectric micromachined ultrasonic transducers (PMUTs), an array of capacitive micromachined ultrasonic transducers (CMUTs), etc. In some such examples, a piezoelectric receiver layer, PMUT elements in a single-layer array of PMUTs, or CMUT elements in a single-layer array of CMUTs, may be used as ultrasonic transmitters as well as ultrasonic receivers.

In this example, the transmitted ultrasonic waves 214 have been transmitted from the ultrasonic transmitter 105 through a sensor stack 218 and into an overlying finger 206. The various layers of the sensor stack 218 may, in some examples, include one or more substrates of glass or other material (such as plastic or sapphire) that is substantially transparent to visible light. In this example, the sensor stack 218 includes a substrate 210 to which a light source system (not shown) is coupled, which may be a backlight of a display according to some implementations. In alternative implementations, a light source system may be coupled to a front light. Accordingly, in some implementations a light source system may be configured for illuminating a display and the target object. Other implementations may not include the substrate 210.

In this implementation, the substrate 210 is coupled to a thin-film transistor (TFT) substrate 212 for the ultrasonic receiver 103. According to this example, a piezoelectric receiver layer 220 overlies the sensor pixels 202a of the ultrasonic receiver 103 and a platen 225 overlies the piezoelectric receiver layer 220. Accordingly, in this example the apparatus 101 is capable of transmitting the ultrasonic waves 214 through one or more substrates of the sensor stack 218 that include the ultrasonic receiver 103 with the TFT substrate 212 and the platen 225, which may also be viewed as a substrate. In alternative examples, the sensor pixels 202a and 202b of the ultrasonic receiver 103 may reside between the substrate 212 and the ultrasonic transmitter 105.

According to this example, a force sensor is integrated into circuitry of the ultrasonic fingerprint sensor. In this implementation, sensor pixels 202b are force sensor pixels of the force sensor.

In some implementations, sensor pixels 202a and sensor pixels 202b may be transparent, partially transparent or substantially transparent, such that the apparatus 101 may be capable of transmitting light from a light source system through elements of the ultrasonic receiver 103. In some implementations, the ultrasonic receiver 103 and associated circuitry may be formed on or in a glass, plastic or silicon substrate.

Referring again to FIG. 2A, in some implementations method 200 may involve performing an anti-spoofing process. According to some implementations, method 200 may involve additional processes that depend on the outcome of the authentication process of block 217 and/or the anti-spoofing process, if any. For example, if the authentication process and/or the anti-spoofing process (if any) conclude successfully, a control system may allow access to a device and/or to a secure area. In some such instances, a control system may unlock a mobile device, a laptop computer, a door, an automobile, or another device.

In some instances, an anti-spoofing process may also be based, at least in part, on a first fingerprint image corresponding to the first ultrasonic receiver signals and/or a second fingerprint image corresponding to the second ultrasonic receiver signals. Some implementations may involve an anti-spoofing process that is based, at least in part, on at least one measured or estimated force.

Figure 3:
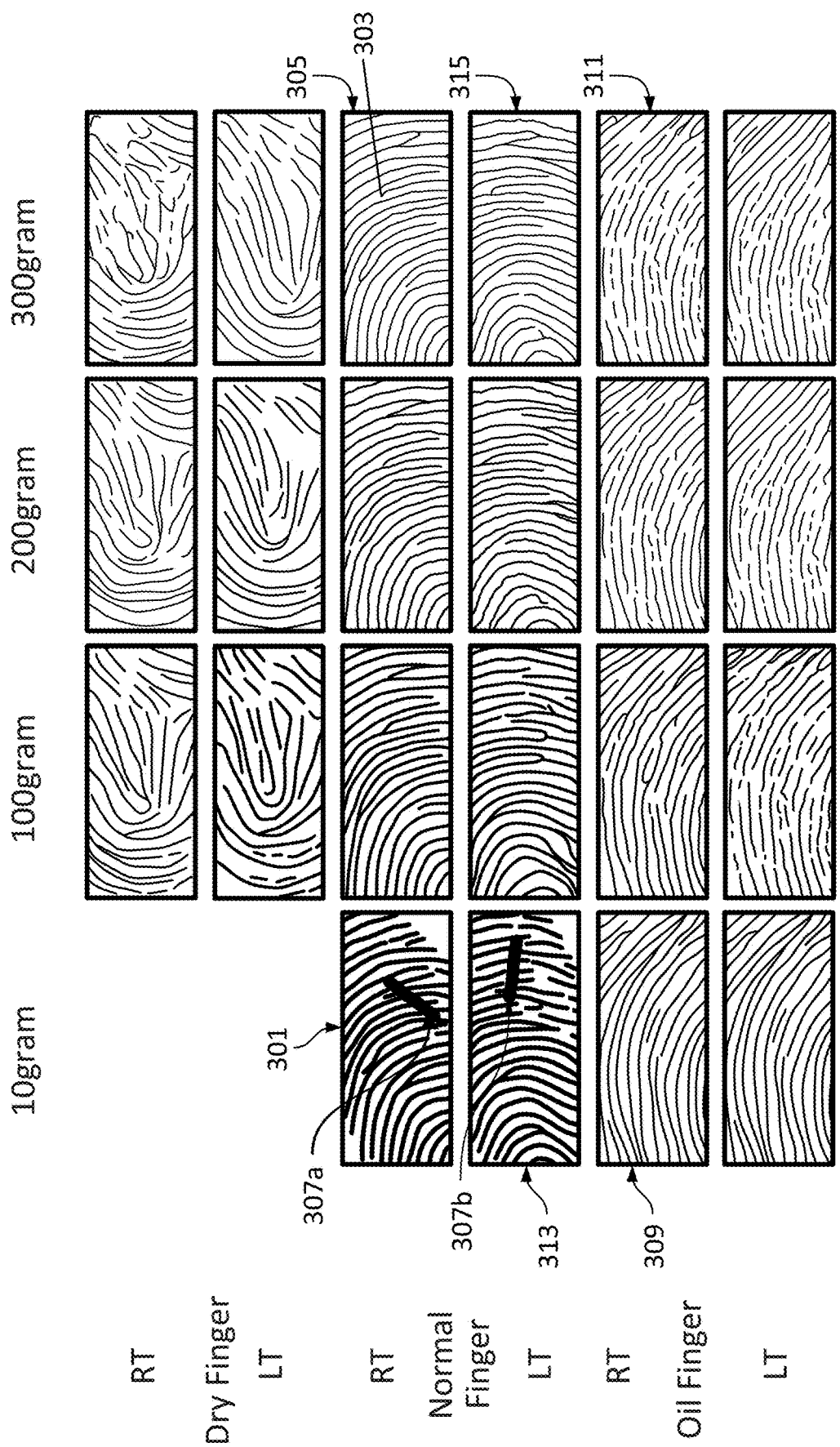
FIG. 3 shows examples of fingerprint images and corresponding forces.

FIG. 3 shows examples of fingerprint images and corresponding forces. The indicated forces are in gram-force units. Despite the fact that grams are actually units of mass, not force, the discussion in this disclosure may refer to forces or pressures as being in "grams" for convenience and economy of language. In FIG. 3, "RT" means right thumb and "LT" means left thumb.

In FIG. 3, the relatively darker portions of the images correspond to areas with relatively higher-amplitude reflections. As noted above, the relatively higher-amplitude reflections will generally correspond to air/platen or, more generally, air/outer surface interfaces, which will occur when a fingerprint valley is adjacent the outer surface. The relatively higher-amplitude reflections occur because the air/outer surface interfaces have higher acoustic impedance contrasts than the skin/outer surface interfaces that will be created when a fingerprint ridge is in contact with the outer surface.

One may see that the image 301 has a much higher percentage of dark regions than image 305. This is because image 301 was obtained when a normal right thumb was pressing on the outer surface with a force of 10 grams, whereas image 305 was obtained when a normal right thumb was pressing on the outer surface with a force of 300 grams. In the latter case, the fingerprint ridges are responding to the applied force by appearing to spread out laterally, in part because portions of the fingerprint ridges that were not contacting the surface when a lower force was applied are now being pressed against the surface. The result is that the image 305 was obtained when a relatively higher percentage of the image corresponded to fingerprint ridge/outer surface interfaces, which correspond to the lighter regions of image 305.

The above-described effect may not be as pronounced for oily fingers. For example, referring to the right thumb "oil finger" example of FIG. 3, one may observe that while image 309 has a slightly higher percentage of dark areas as compared to image 311, the difference is not nearly as great as the difference between image 301 and image 305.

As shown in FIG. 3, some fingerprint image features may be clearer when a larger force is being applied. For example, the termination 303 is more clearly shown in image 305 than in image 301.

However, other fingerprint image features may be clearer when a smaller force is being applied. For example, the fold 307*a* is prominent in image 301, but is not prominent in image 305. Similarly, the fold 307*b* is readily observable in image 313, but is not prominent in image 315.

According to some disclosed implementations, an anti-spoofing process may be based on one or more of the features, or other aspects, of a fingerprint image that change according to pressure. In some such implementations, a fingerprint enrollment process may involve obtaining ultrasonic fingerprint image data for the same portion of a finger at multiple different applied forces. For example, after obtaining a first set of ultrasonic fingerprint image data at a first measured (or estimated) force from a portion of a user's finger, the user could be prompted (e.g., via text and/or an image provided on a display and/or via an audio prompt provided via a speaker) to press down the same portion of the finger more firmly against an outer surface of an ultrasonic fingerprint sensor surface (or a surface of a device proximate an area in which the ultrasonic fingerprint sensor resides). A second applied force could be measured (or estimated) and a second set of ultrasonic fingerprint image data could be obtained from the same portion of the user's finger. In some instances, the process could be repeated in order to obtain third, fourth and/or fifth sets of ultrasonic fingerprint image data when the finger is being pressed against the outer surface with third, fourth and/or fifth measured or estimated forces. According to some implementations, the process could be repeated for multiple digits of the user during the enrollment process.

As described above with reference to FIG. 3, an enrollment process that involves obtaining fingerprint image data when two or more different forces are being applied may reveal characteristics of a finger that would be difficult to spoof. For example, if a hacker were in possession of an image like that of image 305, the hacker would not be able to successfully represent the fold 307*a* shown in image 301. Similarly, if a hacker were in possession of the image 315, the hacker would not be able to successfully represent the fold 307*b* shown in image 313.

During a "run time" operation after successful completion of the enrollment process, an anti-spoofing process may be based, at least in part, on data obtained during the enrollment process. In some instances, the anti-spoofing process may also be based, at least in part, on a first fingerprint image of a target object corresponding to first ultrasonic receiver signals (such as the first ultrasonic receiver signals received in block 205 of FIG. 2) and/or a second fingerprint image of the target object corresponding to second ultrasonic receiver signals (such as the second ultrasonic receiver signals received in block 215 of FIG. 2). Some anti-spoofing processes may involve obtaining a third fingerprint image of the target object corresponding to third ultrasonic receiver signals. In some instances, the target object may be a finger.

In some implementations, the anti-spoofing process may be based, at least in part, on measured or estimated forces of the finger against the outer surface at the times that the ultrasonic receiver signals are obtained.

For example, some examples of method 200 may involve measuring and/or estimating a first force corresponding to the first ultrasonic receiver signals and measuring and/or estimating a second force corresponding to the second ultrasonic receiver signals. In some such examples, method 200 may involve controlling a display and/or a speaker to provide a prompt to apply a different force after measuring and/or estimating the first force.

Figure 4A:
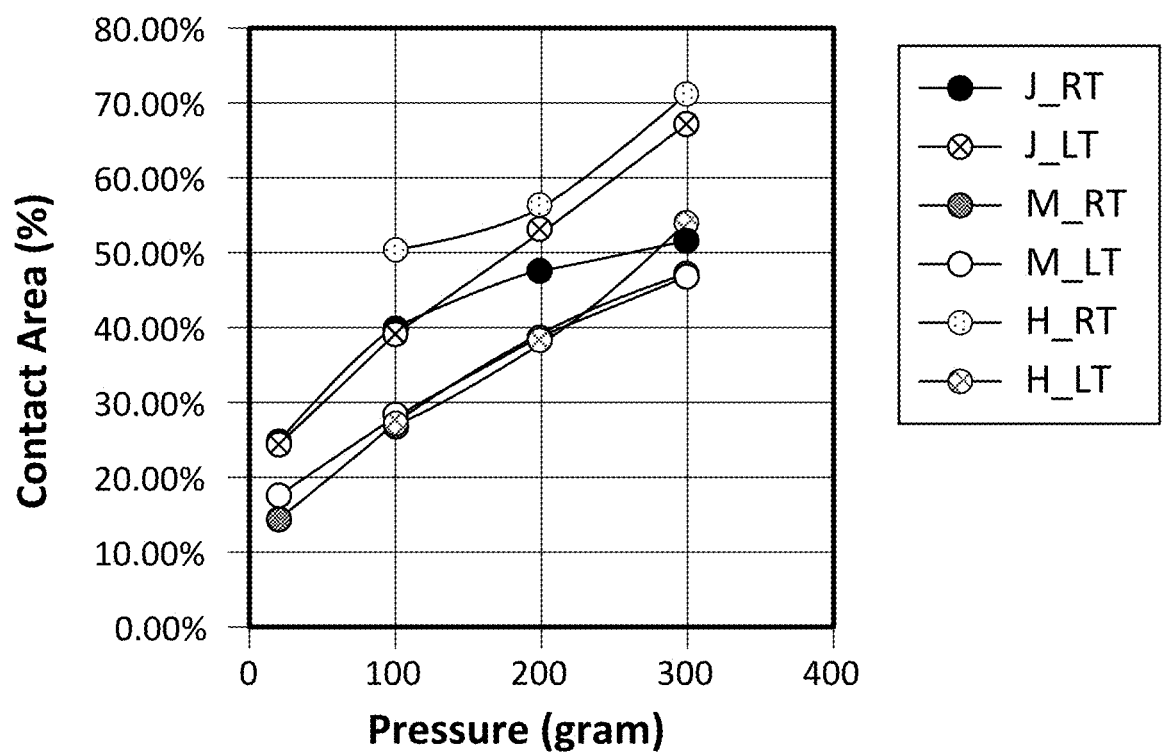
FIGS. 4A, 4B and 4C show examples of graphs that indicate changes in fingerprint images according to changes in applied finger pressure.
Figure 4B:
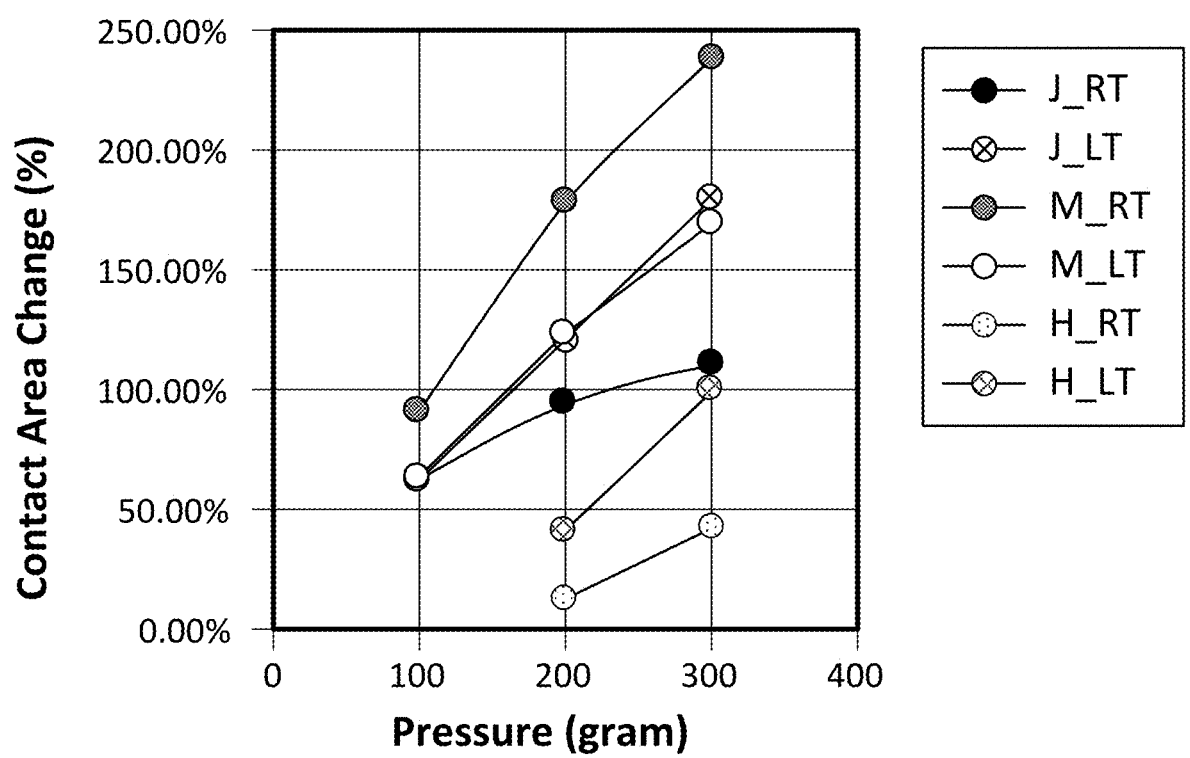
Figure 4C:
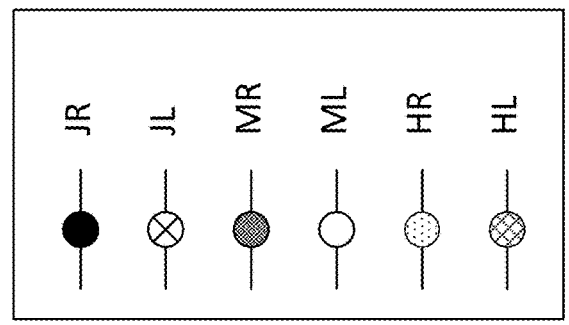
Figure 4C:
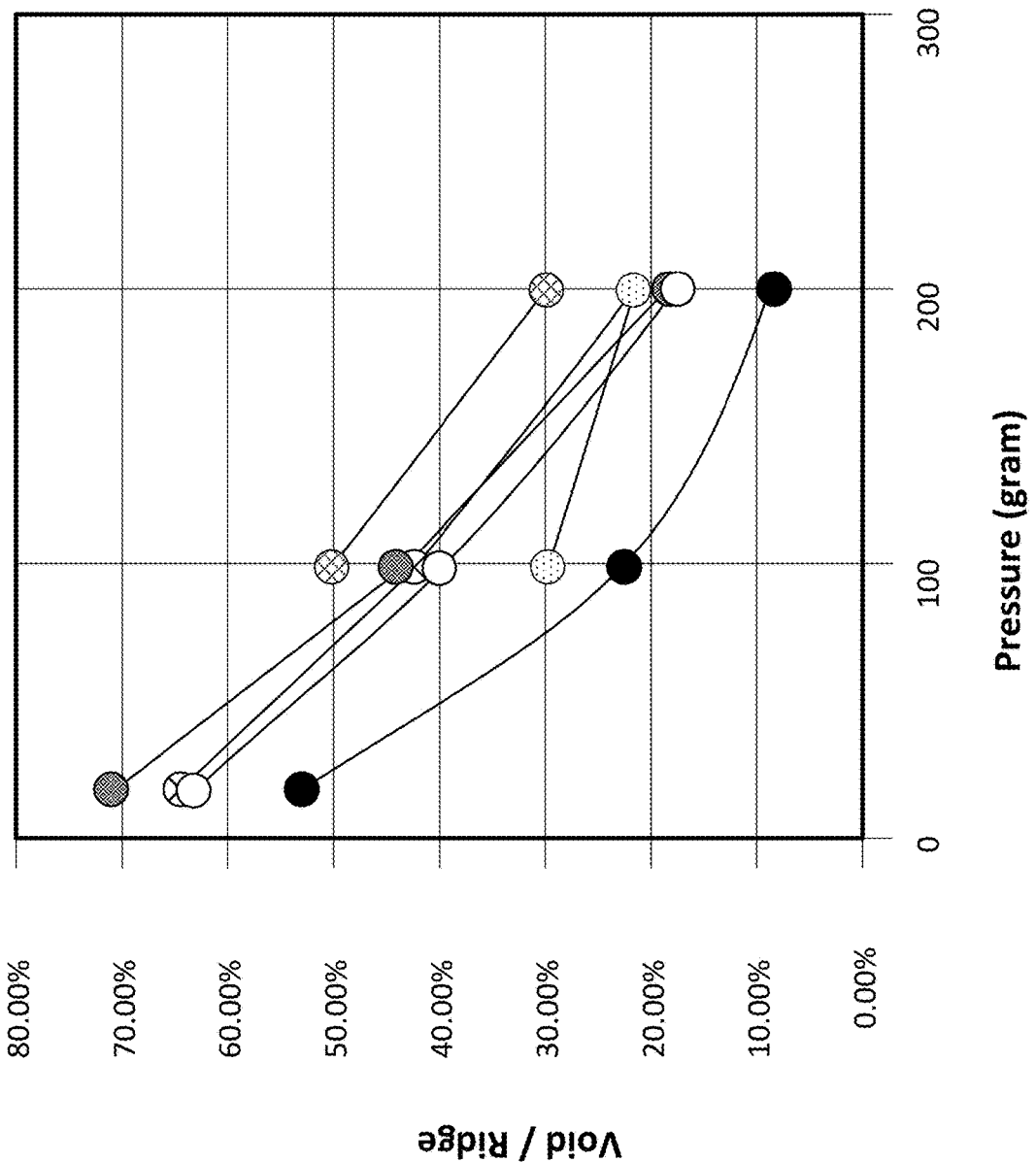

FIGS. 4A, 4B and 4C show examples of graphs that indicate changes in fingerprint images according to changes in applied finger pressure. FIG. 4A shows examples of how the contact area of various fingers changed according to increased pressure. The curves in FIG. 4A correspond to the left and right thumbs (LT and RT) of three different individuals (J, M and H). In these examples, J_RT and J_LT correspond to normal fingers, M_RT and M_LT correspond to worn fingers, and H_RT and H_LT correspond to dry fingers. It may be seen in FIG. 4A that the contact area generally increased with increased pressure, as described above. However, each finger responded to the increased pressure in a different manner. It may be seen in FIG. 4A, for example, that the contact areas of these digits vary substantially at the same pressure levels. For example, the H_RT curve indicates a contact area slightly above 50% at an applied pressure of 100 grams, whereas the contact areas of the curves M_RT, M_LT and H_LT indicate contact areas slightly below 30% at an applied pressure of 100 grams.

It also may be seen in FIG. 4A, that the slopes of the H_RT curve and the H_LT curve increased as the pressure increased from 200 to 300 grams. Both of these curves are concave upwards. In contrast, the slope of the J_LT curve was generally constant in a pressure range from 10 to 300 grams. The slope of the J_RT curve changed significantly in this pressure range, producing a concave downwards curve. The curves shown in FIG. 4B show the above-described contact area changes as a function of pressure. As shown in FIGS. 4A and 4B, these changes are characteristic to particular digits and can change significantly between individuals and also between digits of the same individual.

FIG. 4C shows examples of how the void-to-ridge ratio of fingerprint images changes as a function of applied pressure. A fingerprint "void" is also referred to herein as a fingerprint valley. The curves in FIG. 4C correspond to the left and right thumbs (L and R) of the individuals J, M and H. The values shown in FIG. 4C, as well as the slope changes, are characteristic to particular digits. Both the values and the slopes can change significantly between individuals and between digits of the same individual.

According to some examples, the anti-spoofing process may involve a process of estimating a target object material property. In some such examples, the material property of the target object may be based on the slope of one of more of the graphs shown in FIGS. 4A, 4B and 4C. For example, the slope in FIG. 4A indicates how much a finger deforms when an applied force is increased. The stiffer the finger is, the smaller the deformation is. Normally, there is a positive correlation between stiffness and the dryness of a finger. By tracking this information, further we can derive the material properties, such as Young's modulus and Poisson's ratio. With the same nominal force, the change of contact area indicates the strain on the skin. The strain-stress ratio can be calculated to indicate the relative value of Young's modulus. The ratio of transverse strain (which can be estimated by the contact area change) and the axial strain (which can be estimated by the depth information extracted from a subdermal scan) is used to obtain Poisson's ratio.

Figure 5A:
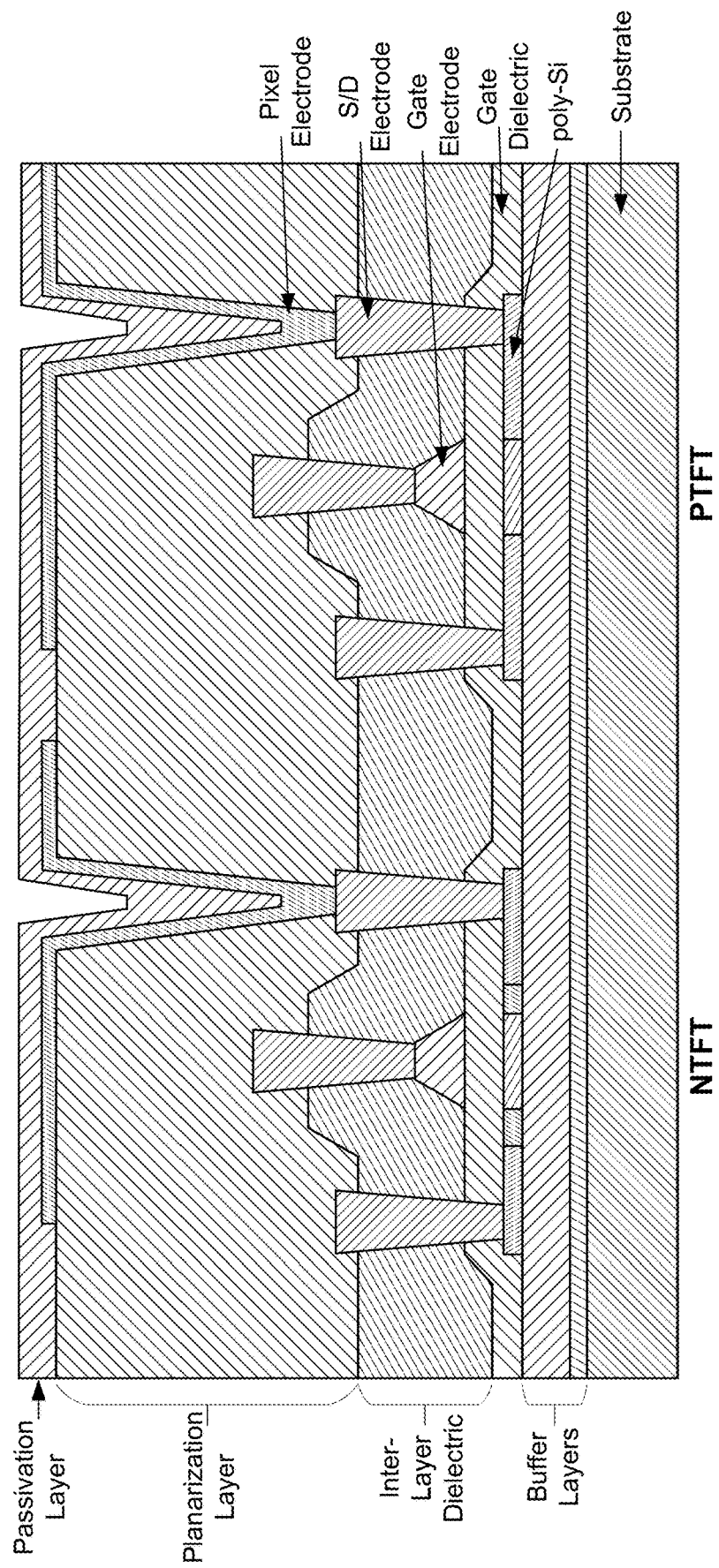
FIGS. 5A, 5B, 5C and 5D show examples of force sensors that are integrated into the circuitry of ultrasonic fingerprint sensors.

FIGS. 5A, 5B, 5C and 5D show examples of force sensors that are integrated into the circuitry of ultrasonic fingerprint sensors. FIG. 5A shows a cross-section through one example of a metal-oxide-semiconductor field-effect transistor (MOSFET), which is a complementary metal-oxide-semiconductor (CMOS) in this example. In FIG. 5A, only a single n-type thin-film transistor (NTFT) and a single p-type TFT (PTFT) are shown. However, in an actual ultrasonic fingerprint sensor having this type of structure would normally have tens of thousands of NTFT/PTFT pairs.

Depending on the particular implementation, portions of different conductive layers of the stack shown in FIG. 5A may be used for a pressure sensor. In some examples, a portion of the pixel electrode layer may be used for the pressure sensor. In other examples, a portion of the source/drain (S/D) electrode layer may be used for the pressure sensor. According to some implementations, a portion of the gate electrode layer may be used for the pressure sensor. In some examples, a portion of the polycrystalline silicon (poly-Si) layer may be used for the pressure sensor. In some implementations, the poly-Si layer may include low-temperature polycrystalline silicon (LTPS).

Figure 5B:
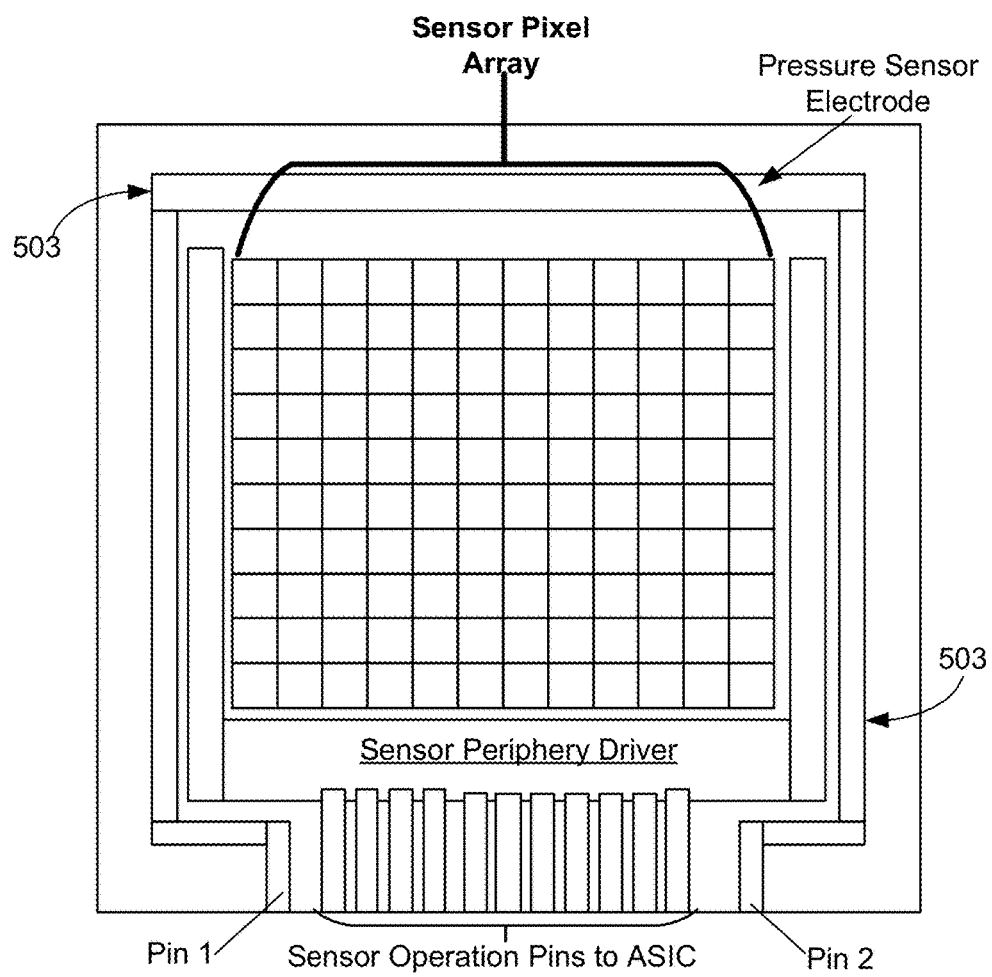

FIG. 5B shows an example of a top view of an ultrasonic fingerprint sensor. In this example, the sensor pixel array and the sensor periphery driver each include multiple instances of a CMOS such as that shown in FIG. 5A. In this instance, a portion of the pixel electrode layer is configured to be used as a conductive part of a pressure sensor. According to this implementation, pin 1, pin 2 and the connected portions 503 of the pixel electrode layer are configured as a pressure sensor electrode. In this example the other pins, which are labeled in FIG. 5A as "sensor operation pins to ASIC," may be used to connect the ultrasonic fingerprint sensor to a corresponding part of the control system. The control system may or may not include an ASIC depending on the particular implementation. According to some examples, the pressure sensor may also include a portion of one or more layers of piezoelectric material included in the ultrasonic fingerprint sensor.

Figure 5C:
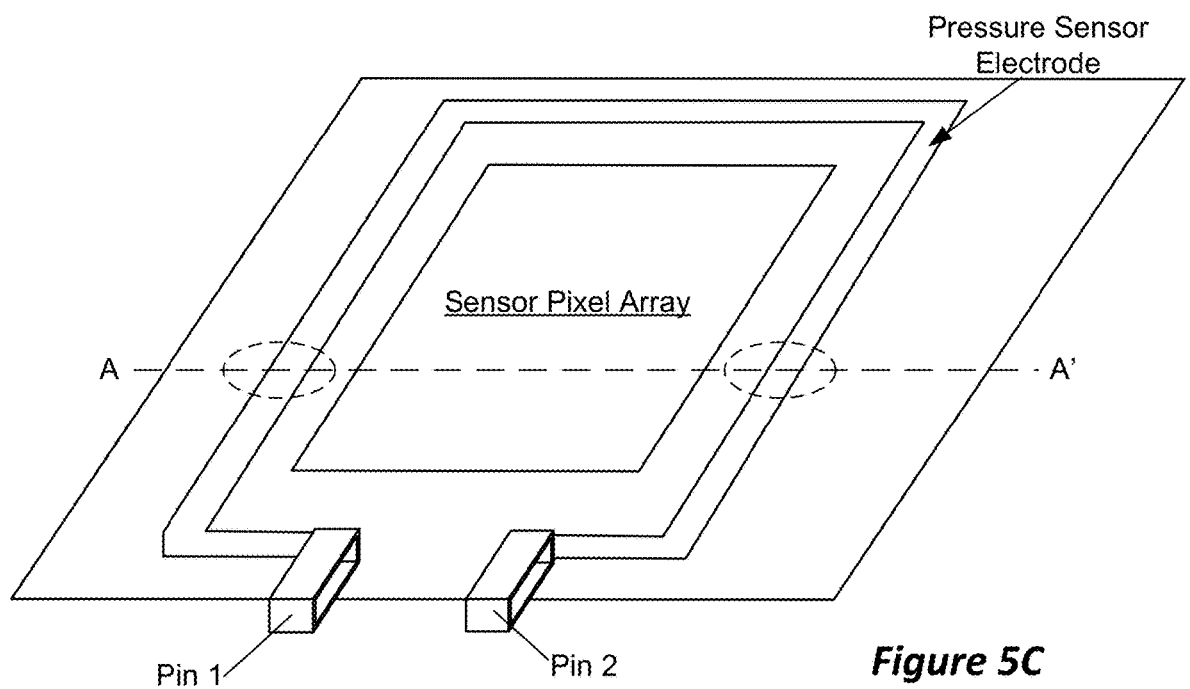

FIG. 5C shows a perspective view of the ultrasonic fingerprint sensor shown in FIG. 5B. FIG. 5C also shows cross-section line A/A', which corresponds with the cross-section shown in FIG. 5D.

Figure 5D:
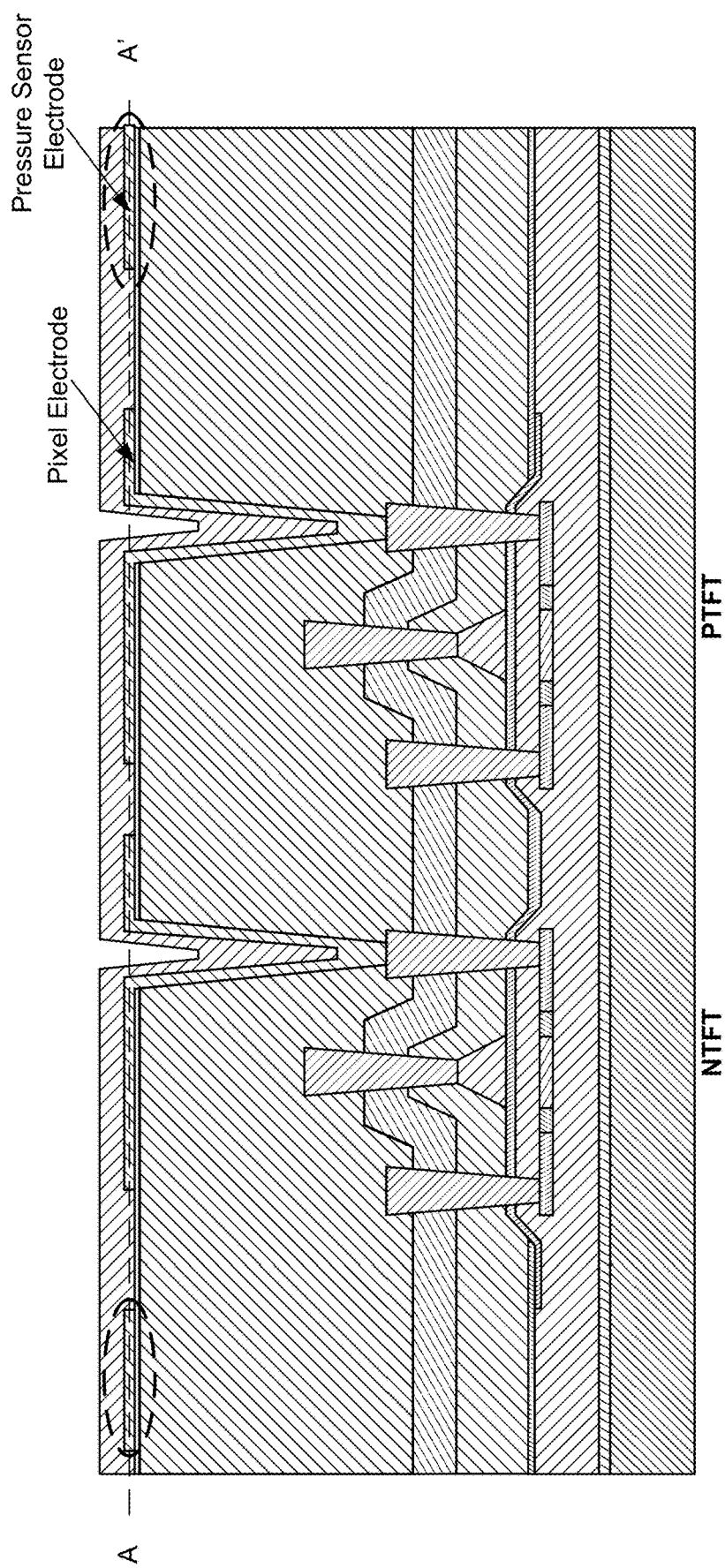

FIG. 5D is a simplified cross-section through the ultrasonic fingerprint sensor shown in FIG. 5C. Like FIG. 5A, the example of FIG. 5D only shows a single NTFT/PTFT pair, whereas an actual ultrasonic fingerprint sensor having this type of structure would normally have many NTFT/PTFT pairs. The cross-section line A/A' is shown traversing the pixel electrode layer and includes the pixel electrodes and the pressure sensor electrodes in this example. Alternative examples in which a portion of a deeper layer (such as a portion of the source/drain (S/D) electrode layer, a portion of the gate electrode layer or a portion of the poly-Si layer) is used to form the pressure sensor electrodes, the device may include vias to connect the deeper layers to a chip pin or other corresponding part of the control system.

As noted elsewhere herein, in some examples at least one ultrasonic fingerprint sensor parameter modification may be based, at least in part, on a measured or estimated force of a target object against an ultrasonic fingerprint sensor surface or a surface of a device proximate an area in which the ultrasonic fingerprint sensor resides. In some examples, the modified parameter(s) may include a gain value, a frequency of a transmitted ultrasonic wave, a range gate delay, a range gate window or a bias condition. Examples of these parameters will now be described with reference to FIG. 6 et seq.

Figure 6:
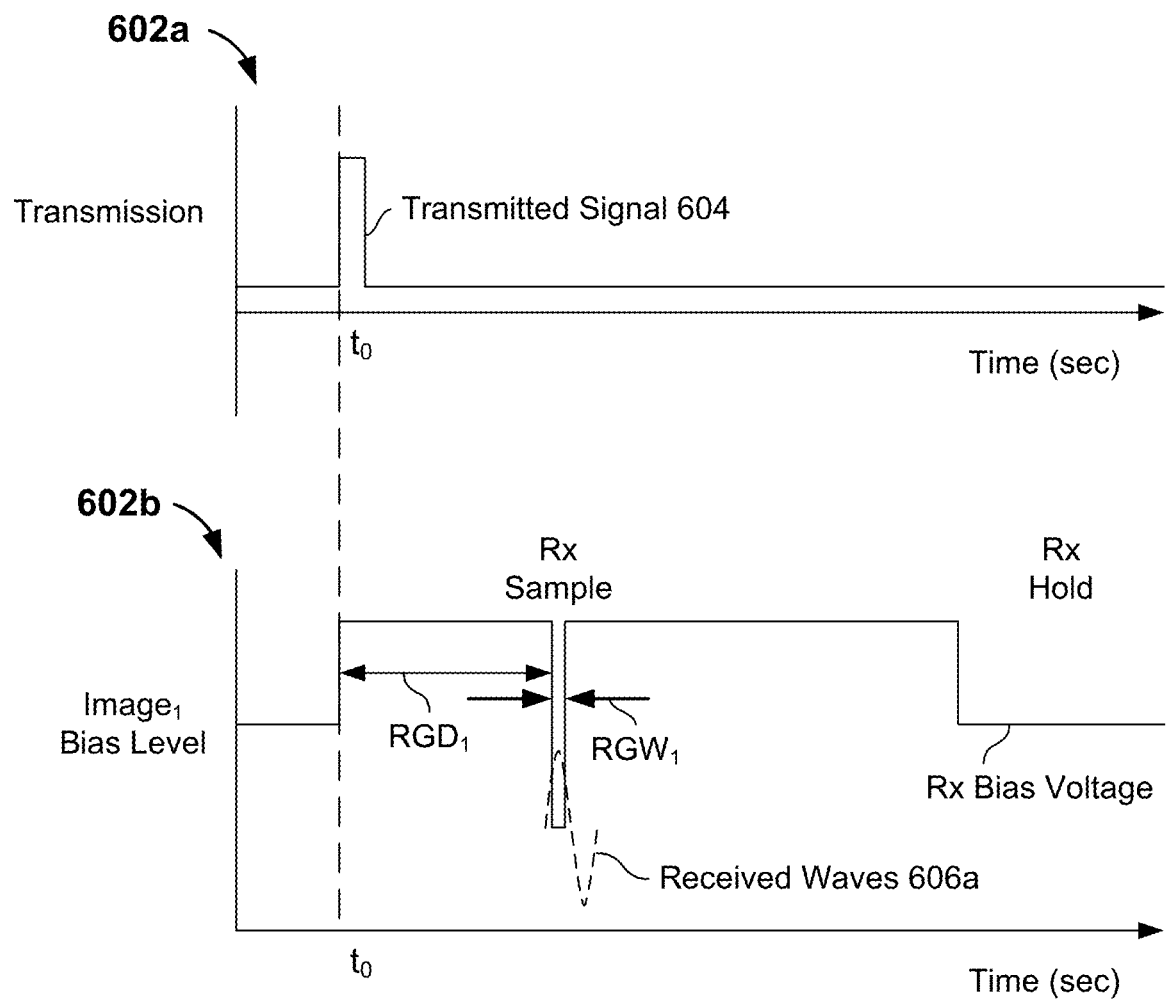
FIG. 6 shows examples of acquisition time delays and acquisition time windows according to some implementations.

FIG. 6 shows examples of acquisition time delays and acquisition time windows according to some implementations. FIG. 6 provides an example of what may be referred to herein as "DBIAS sampling," in which the receiver bias voltage level changes when a signal is sampled. In this example, the receiver bias voltage level also changes when a signal is transmitted. In FIG. 6, an acquisition time delay is labeled as "RGD," an acronym for "range-gate delay," and an acquisition time window is labeled as "RGW," an acronym for "range-gate window." Graph 602a shows a transmitted signal 604 that is initiated at a time $t_0$. The transmitted signal 604 may, for example, be a pulse of ultrasound. The pulse of ultrasound may, for example, correspond to the "first ultrasonic waves" or the "second ultrasonic waves" that are described above with reference to blocks 203 and 213 of FIG. 2A.

Graph 602b shows examples of a first acquisition time delay $RGD_1$ and a first acquisition time window $RGW_1$. The received waves 606a represent reflected ultrasonic waves that are received by an ultrasonic sensor array and sampled during the first acquisition time window $RGW_1$, after the first acquisition time delay $RGD_1$. In some examples, the acquisition time delay may be in the range of about 10 nanoseconds to about 20,000 nanoseconds or more. In some implementations, the first acquisition time window may be in the range of 5 to 50 nanoseconds, or in the range of approximately 5 to 50 nanoseconds. In some examples, "approximately" or "about" may mean within +/−5%, whereas in other examples "approximately" or "about" may mean within +/−10%, +/−15% or +/−20%. However, in some implementations the first acquisition time window may be more than 50 nanoseconds.

According to some examples, the apparatus 101 may include a platen. The platen may be positioned with respect to the ultrasonic sensor system 102. For example, the platen may be positioned proximate the ultrasonic sensor system 102 and/or attached to the ultrasonic sensor system 102. In some such examples, the first acquisition time delay may correspond to an expected amount of time for an ultrasonic wave reflected from a surface of the platen to be received by at least a portion of the ultrasonic sensor system 102. Accordingly, the first acquisition time delay and the first acquisition time window may be selected to capture one or more fingerprint features of a target object placed on a surface of a platen. For example, in some implementations with a platen about 400 microns thick, the acquisition time delay (RGD) may be set to about 1,000 nanoseconds and the acquisition time window (RGW) may be set to about 50 nanoseconds.

Figure 7:
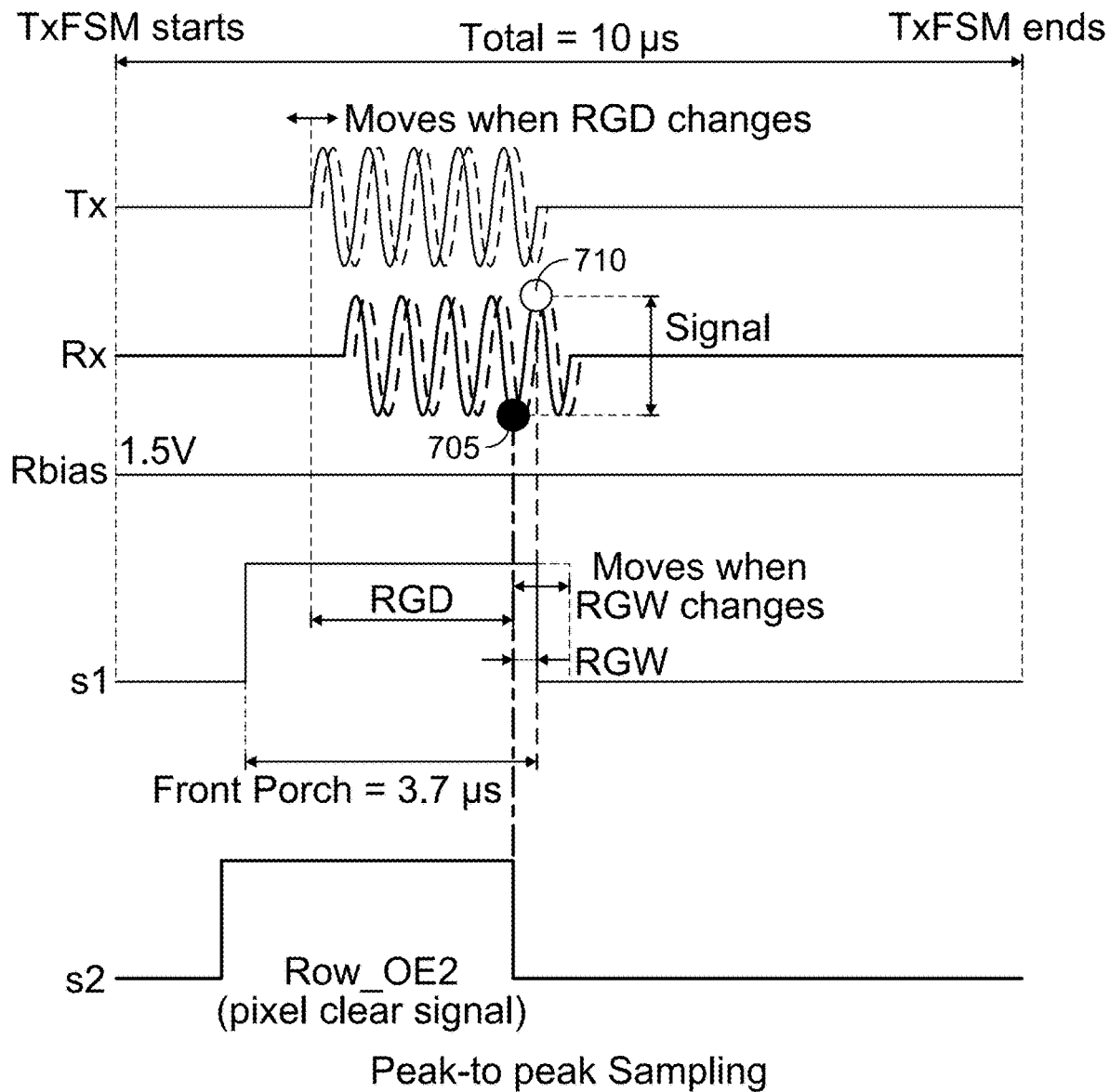
FIG. 7 shows examples of acquisition time delays and acquisition time windows according to some alternative implementations.

FIG. 7 shows examples of acquisition time delays and acquisition time windows according to some alternative implementations. FIG. 7 provides an example of what may be referred to herein as "peak-to-peak sampling." Unlike DBIAS sampling, with peak-to-peak sampling the receiver bias voltage level (labeled Rbias in FIG. 7) does not change when a signal is sampled.

The specific values noted in FIG. 7, including the time and voltage values, are merely provided by way of example and are in no way limiting. As noted in FIG. 7, this example of peak-to-peak involves sampling based on the times of the received negative signal peak 705 and the received positive signal peak 710. According to this example, the RGW corresponds to the time interval between the received negative signal peak 705 and the received positive signal peak 710. In this example RGW corresponds to a half cycle of the driving frequency, which in some examples may be in the range of 10 to 200 ns.

This example of peak-to-peak sampling involves 2 extra control signals, which are labeled S1 and S2 in FIG. 7. In this example of peak-to-peak sampling, RGW and RGD are used to control when to sample. However, the definition of RGD is different in this example from that of the DBIAS sampling example of FIG. 6. In this example of peak-to-peak sampling, RGD changes when RGW changes. In other words, RGD is linked to the time of the received positive signal peak 710. One benefit of peak-to-peak sampling is that one can reduce the tone burst voltage, which in turn leads to a cost reduction on electronic components, better reliability etc.

Figure 8:
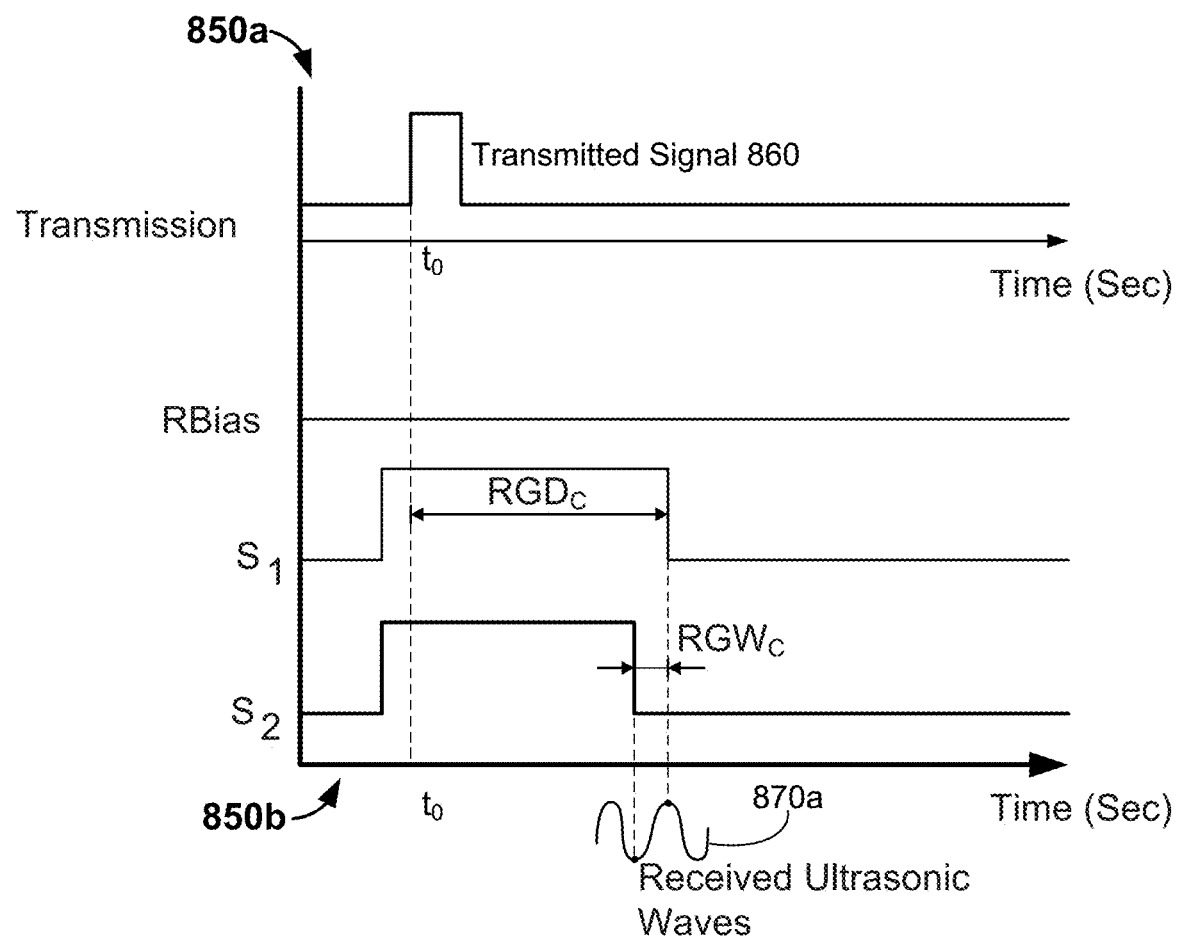
FIG. 8 shows examples of an acquisition time delays and an acquisition time window according to some implementations of peak-to-peak sampling.

FIG. 8 shows examples of an acquisition time delays and an acquisition time window according to some implementations of peak-to-peak sampling. Graph 850a shows a transmitted signal 860 that is initiated at a time to. The transmitted signal 860 may, for example, be a pulse of ultrasound. The pulse of ultrasound may, for example, correspond to the "first ultrasonic waves" or the "second ultrasonic waves" that are described above with reference to blocks 203 and 213 of FIG. 2A. In alternative examples, multiple pulses of ultrasound may be transmitted.

Graph 850b shows examples of a first acquisition time delay RGDc and a first acquisition time window RGWc. The received waves 870a represent reflected ultrasonic waves that are received by an ultrasonic sensor array and sampled during the first acquisition time window RGWc, after the first acquisition time delay RGDc. In some examples, the acquisition time delay may be in the range of about 10 nanoseconds to about 20,000 nanoseconds or more. In some implementations, the first acquisition time window may be in the range of 5 to 50 nanoseconds, or in the range of approximately 5 to 50 nanoseconds. In some examples, "approximately" or "about" may mean within +/−5%, whereas in other examples "approximately" or "about" may mean within +/−10%, +/−15% or +/−20%. However, in some implementations the first acquisition time window may be more than 50 nanoseconds.

Figure 9:
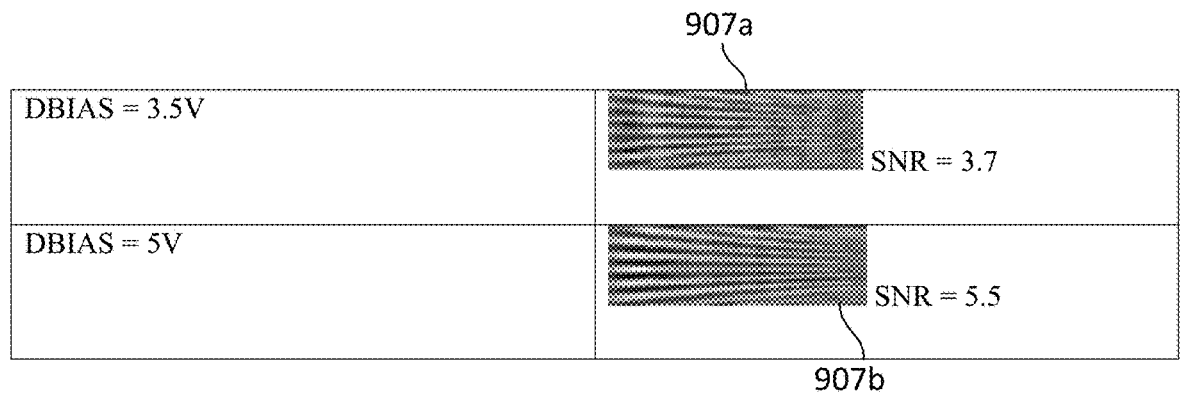
FIGS. 9 and 10A show examples of image quality changes after making an ultrasonic fingerprint sensor parameter modification.
Figure 10A:
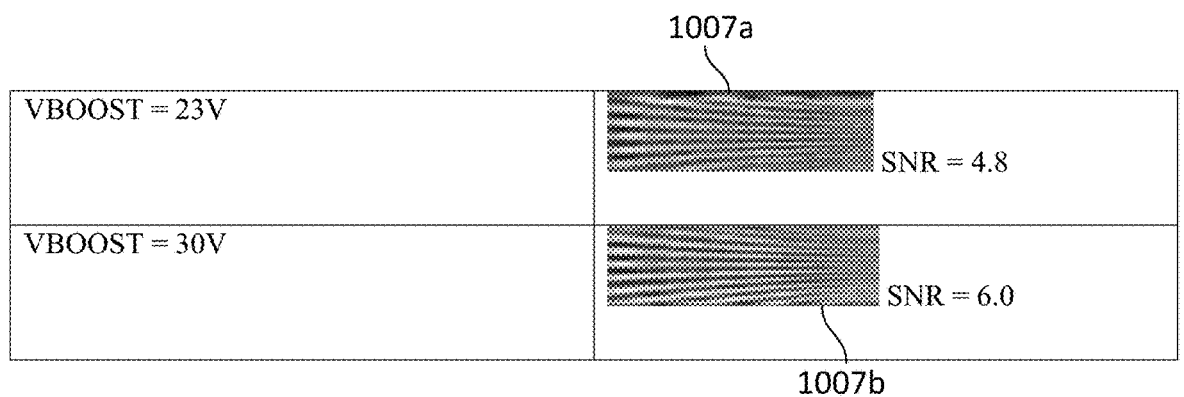

FIGS. 9 and 10A show examples of image quality changes after making an ultrasonic fingerprint sensor parameter modification. In these examples, the ultrasonic fingerprint sensor parameter modification was based, at least in part, on an indication that a measured or estimated force of a target object against an ultrasonic fingerprint sensor surface, or a surface of a device proximate an area in which the ultrasonic fingerprint sensor resides, was below a threshold value. In these examples, the ultrasonic fingerprint sensor parameter modification was also based on a fingerprint image quality metric. In this instance, the fingerprint image quality metric was the signal-to-noise ratio (SNR).

Referring to FIG. 9, in this example the target images 907a and 907b were obtained via the ultrasonic fingerprint sensor according to the same input fingerprint sensor parameters except DBIAS. In this example, a DBIAS setting of 3.5 Volts produced the target image 907a, which has an SNR of 3.7, whereas a DBIAS setting of 5 Volts produced the target image 907b, which has an SNR of 5.5. In these examples, increasing the DBIAS setting caused the fingerprint image 907b to have a higher image quality than that of the fingerprint image 907a.

Referring to FIG. 10A, the target images 1007a and 1007b were obtained via the ultrasonic fingerprint sensor according to the same input fingerprint sensor parameters except VBOOST. With a lower VBOOST, the exciting voltage is smaller, therefore the round-trip returning signal is smaller. If the signal is lower than a threshold, VBOOST can be adjusted to boost the signal. In the example shown in FIG. 10A, increasing VBOOST from 23 Volts to 30 Volts, while keeping all other ultrasonic fingerprint sensor parameters the same, increased the SNR from 4.8 to 6.0.

Figure 10B:
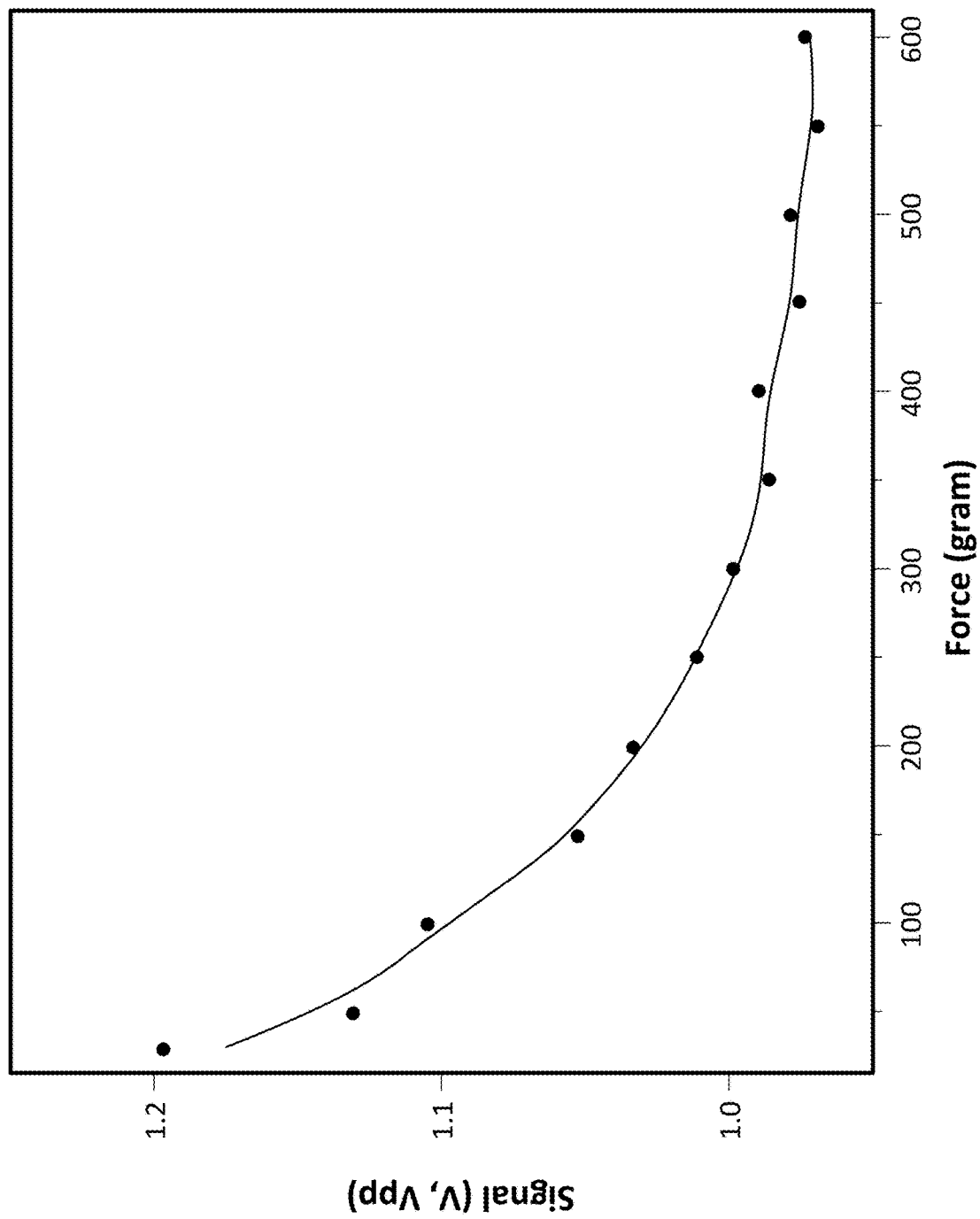
FIG. 10B is a graph that shows changes in received signal strength according to changes in the force applied to a finger on an ultrasonic sensor according to some examples.

FIG. 10B is a graph that shows changes in received signal strength according to changes in the force applied to a finger on an ultrasonic sensor according to some examples. In the examples depicted in FIG. 10B, the ultrasonic sensor system used for the scans was of the general type shown in FIG. 2B. In this example, the ultrasonic sensor system 102 includes a piezoelectric layer (e.g., the ultrasonic transmitter 105) and an electrode layer 222 proximate a side of the piezoelectric layer. In these examples, the ultrasonic signals corresponding to the ultrasonic scans were obtained via "direct sampling": instead of reading out the signal from each individual sensor pixel of the ultrasonic receiver 103, the reflected ultrasonic waves were received via the electrode layer 222. Each data point shown in FIG. 10B corresponds to an average values from 6 independent tests. The signal strength shown in FIG. 10B indicates the signal reflection from the finger/platen interface. The larger the contact force, the larger the contact area corresponding to fingerprint ridges and therefore the smaller returning signal from the finger/platen interface.

Figure 11:
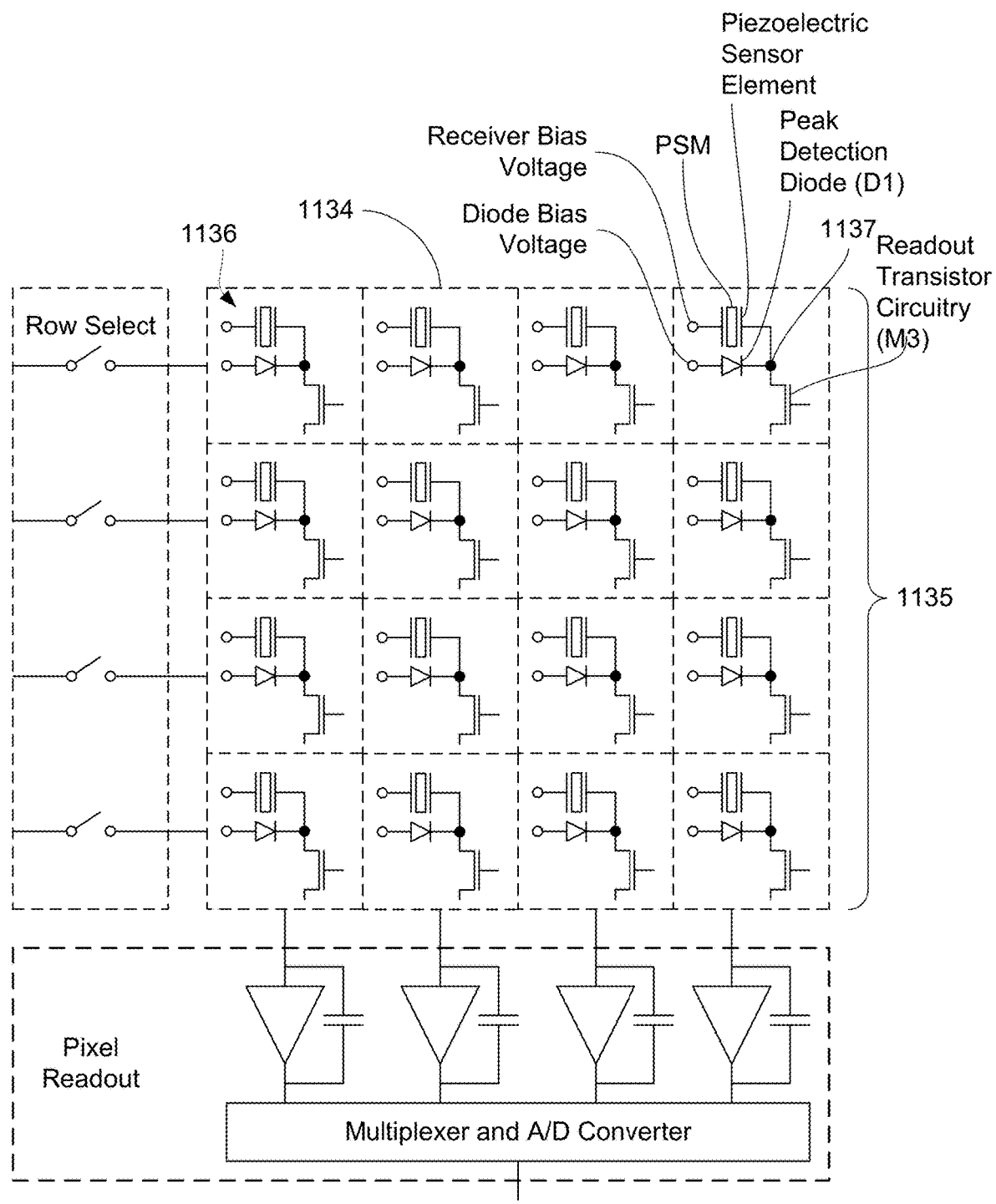
FIG. 11 representationally depicts aspects of a 4×4 pixel array of sensor pixels for an ultrasonic fingerprint sensor.

FIG. 11 representationally depicts aspects of a 4×4 pixel array of sensor pixels for an ultrasonic fingerprint sensor. Each sensor pixel 1134 may be, for example, associated with a local region of piezoelectric sensor material (PSM), a pixel input electrode 1137, a peak detection diode (D1) and a readout transistor circuitry (M3); many or all of these elements may be formed on or in a substrate to form the pixel circuit 1136. In practice, the local region of piezoelectric sensor material of each sensor pixel 1134 may transduce received ultrasonic energy into electrical charges. The peak detection diode D1 may register the maximum amount of charge detected by the local region of piezoelectric sensor material PSM. Each row of the pixel array 1135 may then be scanned, e.g., through a row select mechanism, a gate driver, or a shift register, and the readout transistor circuitry M3 for each column may be triggered to allow the magnitude of the peak charge for each sensor pixel 1134 to be read by additional circuitry, e.g., a multiplexer and an A/D converter. The pixel circuit 1136 may include one or more TFTs to allow gating, addressing, and resetting of the sensor pixel 1134.

Each pixel circuit 1136 may provide information about a small portion of the object detected by the ultrasonic fingerprint sensor. While, for convenience of illustration, the example shown in FIG. 11 is of a relatively coarse resolution, ultrasonic sensors having a resolution on the order of 500 pixels per inch or higher may be configured with an appropriately scaled structure. The detection area of the ultrasonic fingerprint sensor may be selected depending on the intended object of detection. For example, the detection area may range from about 8 mm×3 mm, 5 mm×5 mm or 9 mm×4 mm for a single finger to about 3 inches×3 inches for four fingers. Smaller and larger areas, including square, rectangular and non-rectangular geometries, may be used as appropriate for the target object.

Figure 12A:
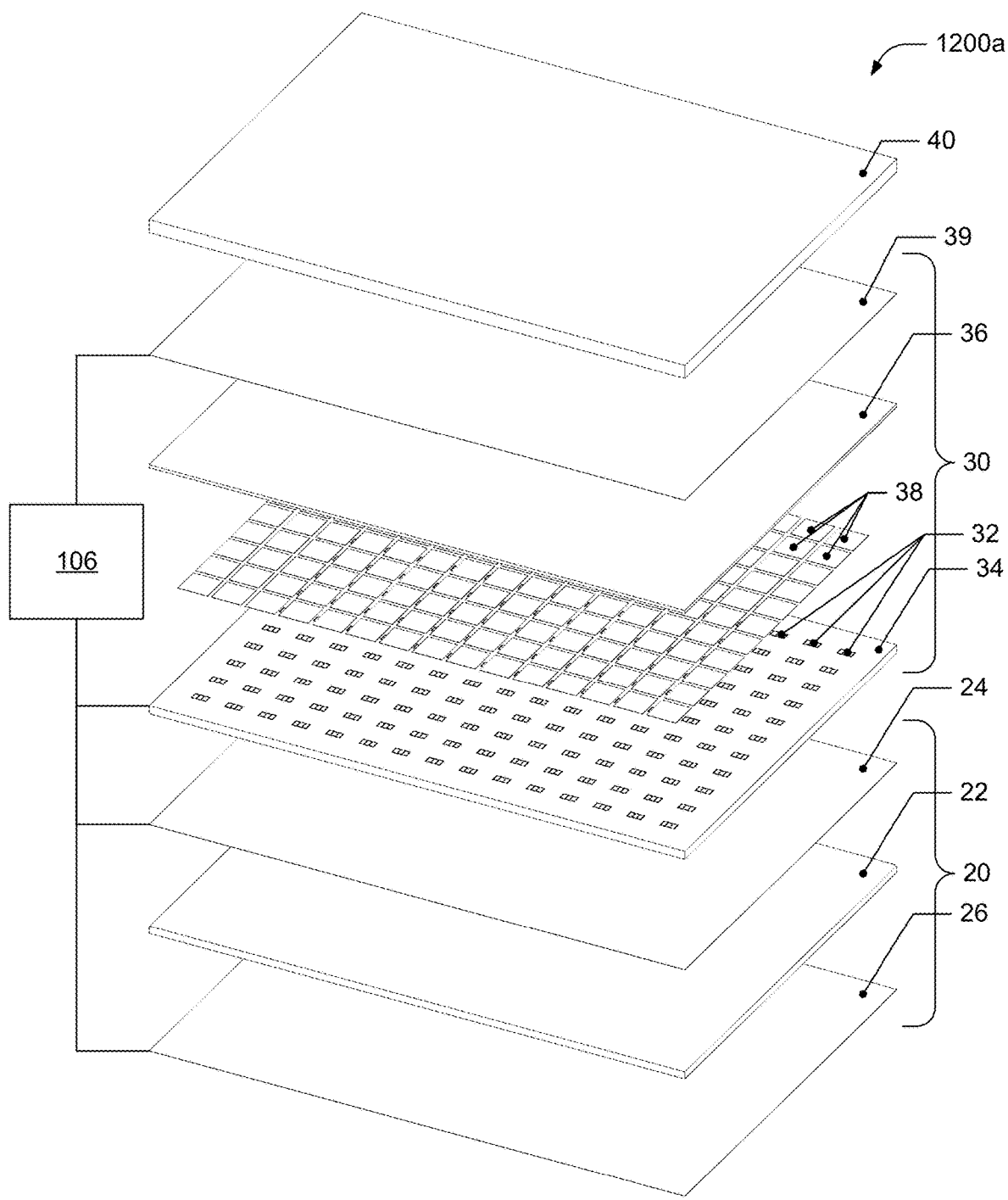
FIGS. 12A and 12B show example arrangements of ultrasonic transmitters and receivers in an ultrasonic fingerprint sensor, with other arrangements being possible.

FIG. 12A shows an example of an exploded view of an ultrasonic fingerprint sensor. In this example, the ultrasonic fingerprint sensor 1200a includes an ultrasonic transmitter 20 and an ultrasonic receiver 30 under a platen 40. According to some implementations, the ultrasonic receiver 30 may be an example of the ultrasonic receiver 103 that is shown in FIG. 1B and described above. In some implementations, the ultrasonic transmitter 20 may be an example of the ultrasonic transmitter 105 that is shown in FIG. 1B and described above. The ultrasonic transmitter 20 may include a substantially planar piezoelectric transmitter layer 22 and may be configured for functioning as a plane wave generator. Ultrasonic waves may be generated by applying a voltage to the piezoelectric layer to expand or contract the layer, depending upon the signal applied, thereby generating a plane wave. In this example, the control system 106 may be configured for causing a voltage that may be applied to the planar piezoelectric transmitter layer 22 via a first transmitter electrode 24 and a second transmitter electrode 26. In this fashion, an ultrasonic wave may be made by changing the thickness of the layer via a piezoelectric effect. This generated ultrasonic wave may travel towards a finger (or other object to be detected), passing through the platen 40. A portion of the wave not absorbed or transmitted by the object to be detected may be reflected so as to pass back through the platen 40 and be received by the ultrasonic receiver 30. The first and second transmitter electrodes 24 and 26 may be metallized electrodes, for example, metal layers that coat opposing sides of the piezoelectric transmitter layer 22.

The ultrasonic receiver 30 may include an array of sensor pixel circuits 32 disposed on a substrate 34, which also may be referred to as a backplane, and a piezoelectric receiver layer 36. In some implementations, each sensor pixel circuit 32 may include one or more TFT- or silicon-based elements, electrical interconnect traces and, in some implementations, one or more additional circuit elements such as diodes, capacitors, and the like. Each sensor pixel circuit 32 may be configured to convert surface charge generated by the piezoelectric receiver layer 36 proximate to the pixel circuit into an electrical signal. Each sensor pixel circuit 32 may include a pixel input electrode 38 that electrically couples the piezoelectric receiver layer 36 to the sensor pixel circuit 32.

In the illustrated implementation, a receiver bias electrode 39 is disposed on a side of the piezoelectric receiver layer 36 proximal to platen 40. The receiver bias electrode 39 may be a metallized electrode and may be grounded or biased to control which signals may be passed to the array of sensor pixel circuits 32. Ultrasonic energy that is reflected from the exposed (top) surface of the platen 40 may be converted into surface charge by the piezoelectric receiver layer 36. The generated surface charge may be coupled to the pixel input electrodes 38 and underlying sensor pixel circuits 32. The charge signal may be amplified or buffered by the sensor pixel circuits 32 and provided to the control system 106.

The control system 106 may be electrically connected (directly or indirectly) with the first transmitter electrode 24 and the second transmitter electrode 26, as well as with the receiver bias electrode 39 and the sensor pixel circuits 32 on the substrate 34. In some implementations, the control system 106 may operate substantially as described above. For example, the control system 106 may be configured for processing the amplified signals received from the sensor pixel circuits 32.

The control system 106 may be configured for controlling the ultrasonic transmitter 20 and/or the ultrasonic receiver 30 to obtain ultrasonic data, which may include fingerprint data. According to some implementations, the control system 106 may be configured for providing functionality such as that described herein.

Whether or not the ultrasonic fingerprint sensor 1200a includes a separate ultrasonic transmitter 20, in some implementations the control system 106 may be configured for obtaining attribute information from the ultrasonic data. In some examples, the control system 106 may be configured for controlling access to one or more devices based, at least in part, on the attribute information. The ultrasonic fingerprint sensor 1200a (or an associated device) may include a memory system that includes one or more memory devices. In some implementations, the control system 106 may include at least a portion of the memory system. The control system 106 may be configured for obtaining attribute information from ultrasonic data and storing the attribute information in the memory system. In some implementations, the control system 106 may be configured for capturing a fingerprint image, obtaining attribute information from the fingerprint image and storing attribute information obtained from the fingerprint image (which may be referred to herein as fingerprint image information) in the memory system. According to some examples, the control system 106 may be configured for capturing a fingerprint image, obtaining attribute information from the fingerprint image and storing attribute information obtained from the fingerprint image even while maintaining the ultrasonic transmitter 20 in an "off" state.

In some implementations, the control system 106 may be configured for operating the ultrasonic fingerprint sensor 1200a in an ultrasonic imaging mode or a force-sensing mode. In some implementations, the control system may be configured for maintaining the ultrasonic transmitter 20 in an "off" state when operating the ultrasonic fingerprint sensor in a force-sensing mode. The ultrasonic receiver 30 may be configured for functioning as a force sensor when the ultrasonic fingerprint sensor 1200a is operating in the force-sensing mode. In some implementations, the control system 106 may be configured for controlling other devices, such as a display system, a communication system, etc. In some implementations, the control system 106 may be configured for operating the ultrasonic fingerprint sensor 1200a in a capacitive imaging mode.

The platen 40 may be any appropriate material that can be acoustically coupled to the receiver, with examples including plastic, ceramic, sapphire, metal and glass. In some implementations, the platen 40 may be a cover plate, e.g., a cover glass or a lens glass for a display. Particularly when the ultrasonic transmitter 20 is in use, fingerprint detection and imaging can be performed through relatively thick platens if desired, e.g., 3 mm and above. However, for implementations in which the ultrasonic receiver 30 is configured for imaging fingerprints in a force detection mode or a capacitance detection mode, a thinner and relatively more compliant platen 40 may be desirable. According to some such implementations, the platen 40 may include one or more polymers, such as one or more types of parylene, and may be substantially thinner. In some such implementations, the platen 40 may be tens of microns thick or even less than 10 microns thick.

Examples of piezoelectric materials that may be used to form the piezoelectric receiver layer 36 include piezoelectric polymers having appropriate acoustic properties, for example, an acoustic impedance between about 2.5 MRayls and 5 MRayls. Specific examples of piezoelectric materials that may be employed include ferroelectric polymers such as polyvinylidene fluoride (PVDF) and polyvinylidene fluoride-trifluoroethylene (PVDF-TrFE) copolymers. Examples of PVDF copolymers include 60:40 (molar percent) PVDF-TrFE, 70:30 PVDF-TrFE, 80:20 PVDF-TrFE, and 90:10 PVDR-TrFE. Other examples of piezoelectric materials that may be employed include polyvinylidene chloride (PVDC)

homopolymers and copolymers, polytetrafluoroethylene (PTFE) homopolymers and copolymers, and diisopropylammonium bromide (DIPAB).

The thickness of each of the piezoelectric transmitter layer 22 and the piezoelectric receiver layer 36 may be selected so as to be suitable for generating and receiving ultrasonic waves. In one example, a PVDF planar piezoelectric transmitter layer 22 is approximately 28 µm thick and a PVDF-TrFE receiver layer 36 is approximately 12 µm thick. Example frequencies of the ultrasonic waves may be in the range of 5 MHz to 30 MHz, with wavelengths on the order of a millimeter or less.

Figure 12B:
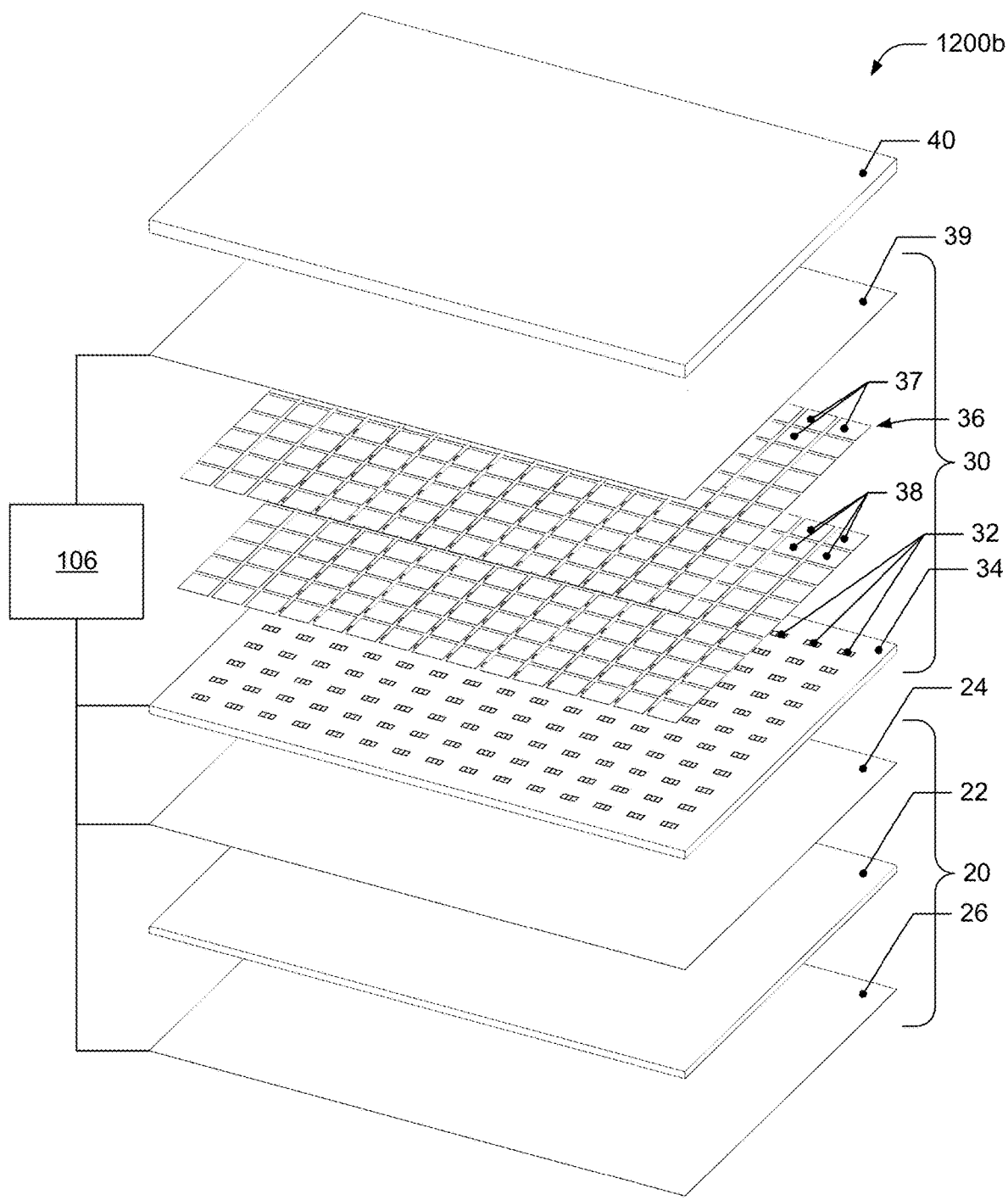

FIG. 12B shows an exploded view of an alternative example of an ultrasonic fingerprint sensor. In this example, the piezoelectric receiver layer 36 has been formed into discrete elements 37. In the implementation shown in FIG. 12B, each of the discrete elements 37 corresponds with a single pixel input electrode 38 and a single sensor pixel circuit 32. However, in alternative implementations of the ultrasonic fingerprint sensor 1200b, there is not necessarily a one-to-one correspondence between each of the discrete elements 37, a single pixel input electrode 38 and a single sensor pixel circuit 32. For example, in some implementations there may be multiple pixel input electrodes 38 and sensor pixel circuits 32 for a single discrete element 37.

FIGS. 12A and 12B show example arrangements of ultrasonic transmitters and receivers in an ultrasonic fingerprint sensor, with other arrangements being possible. For example, in some implementations, the ultrasonic transmitter 20 may be above the ultrasonic receiver 30 and therefore closer to the object(s) to be detected. In some implementations, the ultrasonic transmitter may be included with the ultrasonic sensor array (e.g., a single-layer transmitter and receiver). In some implementations, the ultrasonic fingerprint sensor may include an acoustic delay layer. For example, an acoustic delay layer may be incorporated into the ultrasonic fingerprint sensor between the ultrasonic transmitter 20 and the ultrasonic receiver 30. An acoustic delay layer may be employed to adjust the ultrasonic pulse timing, and at the same time electrically insulate the ultrasonic receiver 30 from the ultrasonic transmitter 20. The acoustic delay layer may have a substantially uniform thickness, with the material used for the delay layer and/or the thickness of the delay layer selected to provide a desired delay in the time for reflected ultrasonic energy to reach the ultrasonic receiver 30. In doing so, the range of time during which an energy pulse that carries information about the object by virtue of having been reflected by the object may be made to arrive at the ultrasonic receiver 30 during a time range when it is unlikely that energy reflected from other parts of the ultrasonic fingerprint sensor is arriving at the ultrasonic receiver 30. In some implementations, the substrate 34 and/or the platen 40 may serve as an acoustic delay layer.

Figure 12C:
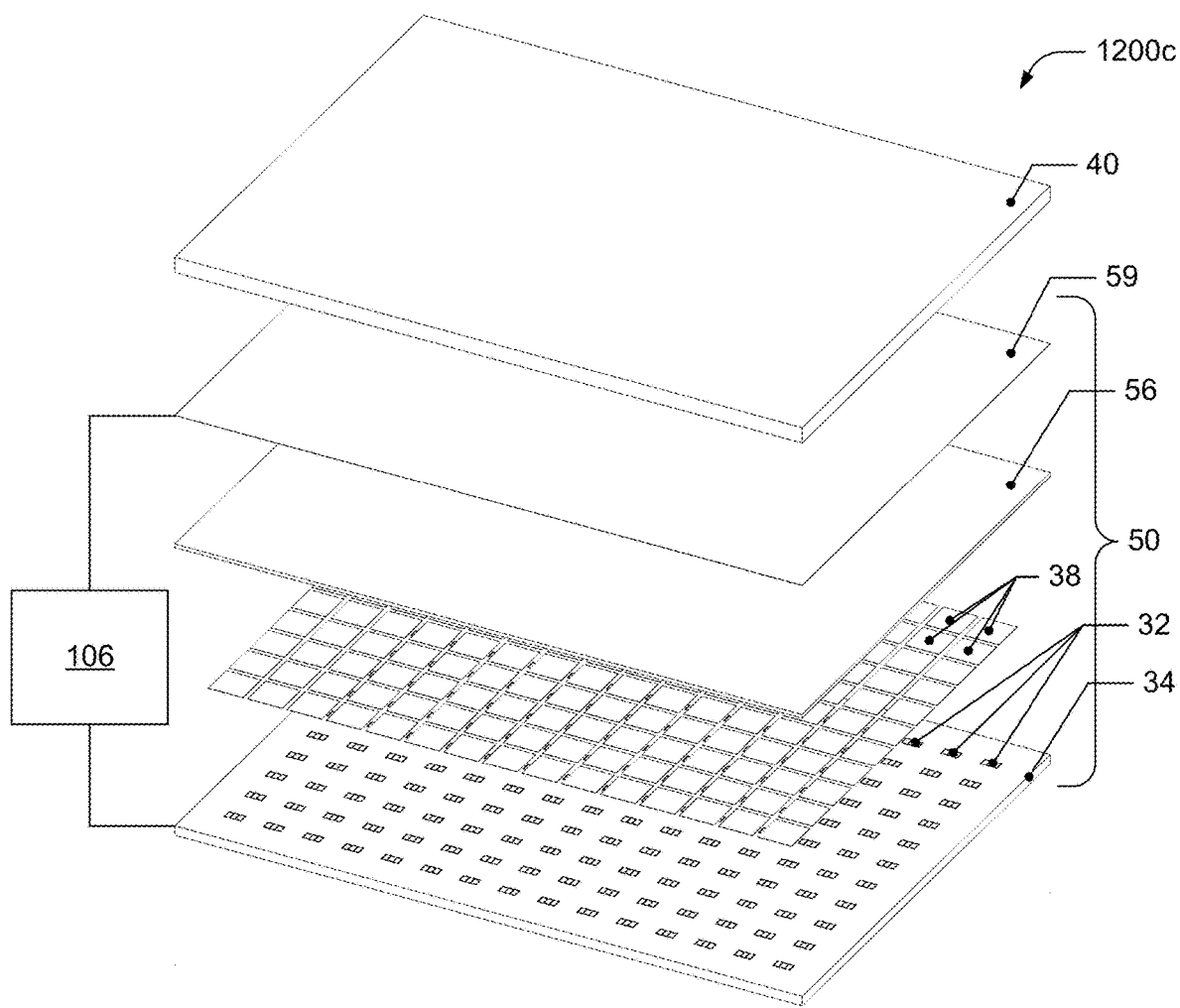
FIG. 12C shows an example of an ultrasonic transceiver array in an ultrasonic fingerprint sensor.

FIG. 12C shows an exploded view of an example of an ultrasonic fingerprint sensor. In this example, the ultrasonic fingerprint sensor 1200c includes an ultrasonic transceiver array 50 under a platen 40. According to some implementations, the ultrasonic transceiver array 50 may serve as both the ultrasonic receiver 103 and the ultrasonic transmitter 105 that is shown in FIG. 1B and described above. The ultrasonic transceiver array 50 may include a substantially planar piezoelectric transceiver layer 56 configured for functioning as a plane wave generator. Ultrasonic waves may be generated by applying a voltage across the transceiver layer 56. The control system 106 may be configured for generating a transceiver excitation voltage that may be applied to the piezoelectric transceiver layer 56 via one or more underlying pixel input electrodes 38 or one or more overlying transceiver bias electrodes 59. The generated ultrasonic wave may travel towards a finger or other object to be detected, passing through the platen 40. A portion of the wave not absorbed or transmitted by the object may be reflected so as to pass back through the platen 40 and be received by the ultrasonic transceiver array 50.

The ultrasonic transceiver array 50 may include an array of sensor pixel circuits 32 disposed on a substrate 34. In some implementations, each sensor pixel circuit 32 may include one or more TFT- or silicon-based elements, electrical interconnect traces and, in some implementations, one or more additional circuit elements such as diodes, capacitors, and the like. Each sensor pixel circuit 32 may include a pixel input electrode 38 that electrically couples the piezoelectric transceiver layer 56 to the sensor pixel circuit 32.

In the illustrated implementation, the transceiver bias electrode 59 is disposed on a side of the piezoelectric transceiver layer 56 proximal to the platen 40. The transceiver bias electrode 59 may be a metallized electrode and may be grounded or biased to control which signals may be generated and which reflected signals may be passed to the array of sensor pixel circuits 32. Ultrasonic energy that is reflected from the exposed (top) surface of the platen 40 may be converted into surface charge by the piezoelectric transceiver layer 56. The generated surface charge may be coupled to the pixel input electrodes 38 and underlying sensor pixel circuits 32. The charge signal may be amplified or buffered by the sensor pixel circuits 32 and provided to the control system 106.

The control system 106 may be electrically connected (directly or indirectly) to the transceiver bias electrode 59 and the sensor pixel circuits 32 on the sensor substrate 34. In some implementations, the control system 106 may operate substantially as described above. For example, the control system 106 may be configured for processing the amplified signals received from the sensor pixel circuits 32.

The control system 106 may be configured for controlling the ultrasonic transceiver array 50 to obtain ultrasonic data, which may include fingerprint data. According to some implementations, the control system 106 may be configured for providing functionality such as that described herein, e.g., such as described herein.

In other examples of an ultrasonic fingerprint sensor with an ultrasonic transceiver array, a backside of the sensor substrate 34 may be attached directly or indirectly to an overlying platen 40. In operation, ultrasonic waves generated by the piezoelectric transceiver layer 56 may travel through the sensor substrate 34 and the platen 40, reflect off a surface of the platen 40, and travel back through the platen 40 and the sensor substrate 34 before being detected by sensor pixel circuits 32 on or in the substrate sensor 34.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium, such as a non-transitory medium. The processes of a method or algorithm disclosed herein may be implemented in a processor-executable software module which may reside on a computer-readable medium. Computer-readable media include both computer storage media and communication media including any medium that may be enabled to transfer a computer program from one place to another. Storage media may be any available media that may be accessed by a computer. By way of example, and not limitation, non-transitory media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those having ordinary skill in the art, and the generic principles defined herein may be applied to other implementations without departing from the scope of this disclosure. Thus, the disclosure is not intended to be limited to the implementations shown herein, but is to be accorded the widest scope consistent with the claims, the principles and the novel features disclosed herein. The word "exemplary" is used exclusively herein, if at all, to mean "serving as an example, instance, or illustration." Any implementation described herein as "exemplary" is not necessarily to be construed as preferred or advantageous over other implementations.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, other implementations are within the scope of the following claims. In some cases, the actions recited in the claims may be performed in a different order and still achieve desirable results.

It will be understood that unless features in any of the particular described implementations are expressly identified as incompatible with one another or the surrounding context implies that they are mutually exclusive and not readily combinable in a complementary and/or supportive sense, the totality of this disclosure contemplates and envisions that specific features of those complementary implementations may be selectively combined to provide one or more comprehensive, but slightly different, technical solutions. It will therefore be further appreciated that the above description has been given by way of example only and that modifications in detail may be made within the scope of this disclosure.

The invention claimed is:

1. An apparatus, comprising:
an ultrasonic fingerprint sensor; and
a control system configured for:
controlling the ultrasonic fingerprint sensor for transmission of first ultrasonic waves towards a target object in contact with a surface, the surface being an ultrasonic fingerprint sensor surface or a surface of a device proximate an area in which the ultrasonic fingerprint sensor resides;
receiving first ultrasonic receiver signals from the ultrasonic fingerprint sensor, the first ultrasonic receiver signals including signals corresponding to reflections of the first ultrasonic waves from the target object;
obtaining an estimation of a force applied by the target object on the surface;
determining at least one ultrasonic fingerprint sensor parameter modification based, at least in part, on the force;

updating at least one setting of the ultrasonic fingerprint sensor based, at least in part, on the ultrasonic fingerprint sensor parameter modification;

controlling the ultrasonic fingerprint sensor for transmission of second ultrasonic waves towards the target object;

receiving second ultrasonic receiver signals from the ultrasonic fingerprint sensor, the second ultrasonic receiver signals including signals corresponding to reflections of the second ultrasonic waves from the target object; and performing an authentication process based, at least in part, on the first ultrasonic receiver signals and the second ultrasonic receiver signals.

2. The apparatus of claim 1, wherein the at least one ultrasonic fingerprint sensor parameter modification includes at least one of a gain value modification, a modification of a frequency of a transmitted ultrasonic wave, a range gate delay modification, a range gate window modification or a modification of a bias condition.

3. The apparatus of claim 1, wherein determining the at least one ultrasonic fingerprint sensor parameter modification involves obtaining at least one new ultrasonic fingerprint sensor parameter from a portion of a data structure corresponding to the force, the data structure including force values and corresponding ultrasonic fingerprint sensor parameters.

4. The apparatus of claim 1, wherein the estimation of the force is based, at least in part, on analysis of the first ultrasonic receiver signals.

5. The apparatus of claim 1, wherein the estimation of the force is based, at least in part, on analysis of a first fingerprint image corresponding to the first ultrasonic receiver signals.

6. The apparatus of claim 5, wherein the estimation of the force is based on one or more of a contact area, a void to ridge ratio or a ridge distance of the first fingerprint image.

7. The apparatus of claim 1, further comprising a force sensor, wherein the estimation of the force is based, at least in part, on force sensor signals received from the force sensor.

8. The apparatus of claim 7, wherein the force sensor is integrated into circuitry of the ultrasonic fingerprint sensor.

9. The apparatus of claim 7, wherein the force sensor is separate from the ultrasonic fingerprint sensor.

10. The apparatus of claim 7, wherein the force sensor comprises one or more of a piezo-resistive sensor, a capacitive sensor or a polymer-based thin film sensor.

11. The apparatus of claim 10, wherein the force sensor comprises the piezo-resistive sensor and wherein the piezo-resistive sensor comprises one or more of silicon, metal, polysilicon or glass.

12. The apparatus of claim 1, wherein the control system is further configured for performing an anti-spoofing process that is based, at least in part, on the force.

13. The apparatus of claim 12, wherein the anti-spoofing process is also based, at least in part, on at least one of a first fingerprint image corresponding to the first ultrasonic receiver signals or a second fingerprint image corresponding to the second ultrasonic receiver signals.

14. The apparatus of claim 12, wherein the anti-spoofing process involves a process of estimating a target object material property.

15. The apparatus of claim 1, wherein the control system is further configured for estimating a first force corresponding to the first ultrasonic receiver signals and estimating a second force corresponding to the second ultrasonic receiver signals.

16. The apparatus of claim 15, further comprising a display, wherein the control system is further configured for controlling the display to provide a prompt to apply a different force after estimating the first force.

17. The apparatus of claim 1, wherein the ultrasonic fingerprint sensor includes an electrode layer proximate an ultrasonic transmitter layer, wherein the first ultrasonic receiver signals are obtained via the electrode layer and wherein the estimation of the force is based, at least in part, on analysis of the first ultrasonic receiver signals.

18. The apparatus of claim 1, wherein the apparatus is integrated into a mobile device.

19. A method of controlling an ultrasonic fingerprint sensor, the method comprising:

controlling the ultrasonic fingerprint sensor for transmission of first ultrasonic waves towards a target object in contact with a surface, the surface being an ultrasonic fingerprint sensor surface or a surface of a device proximate an area in which the ultrasonic fingerprint sensor resides;

receiving first ultrasonic receiver signals from the ultrasonic fingerprint sensor, the first ultrasonic receiver signals including signals corresponding to reflections of the first ultrasonic waves from the target object;

obtaining an estimation of a force applied by the target object on the surface;

determining at least one ultrasonic fingerprint sensor parameter modification based, at least in part, on the force;

updating at least one setting of the ultrasonic fingerprint sensor based, at least in part, on the ultrasonic fingerprint sensor parameter modification;

controlling the ultrasonic fingerprint sensor for transmission of second ultrasonic waves towards the target object;

receiving second ultrasonic receiver signals from the ultrasonic fingerprint sensor, the second ultrasonic receiver signals including signals corresponding to reflections of the second ultrasonic waves from the target object; and performing an authentication process based, at least in part, on the first ultrasonic receiver signals and the second ultrasonic receiver signals.

20. The method of claim 19, wherein the at least one ultrasonic fingerprint sensor parameter modification includes at least one of a gain value modification, a modification of a frequency of a transmitted ultrasonic wave, a range gate delay modification, a range gate window modification or a modification of a bias condition.

21. The method of claim 19, wherein determining the at least one ultrasonic fingerprint sensor parameter modification involves obtaining at least one new ultrasonic fingerprint sensor parameter from a portion of a data structure corresponding to the force, the data structure including force values and corresponding ultrasonic fingerprint sensor parameters.

22. The method of claim 19, wherein the estimation of the force is based, at least in part, on analysis of the first ultrasonic receiver signals.

23. The method of claim 19, wherein the estimation of the force is based, at least in part, on analysis of a first fingerprint image corresponding to the first ultrasonic receiver signals.

24. The method of claim 23, wherein the estimation of the force is based on one or more of a contact area, a void to ridge ratio or a ridge distance of the first fingerprint image.

25. The method of claim 19, wherein the estimation of the force is based, at least in part, on force sensor signals received from a force sensor.

26. The method of claim 19, further comprising performing an anti-spoofing process that is based, at least in part, on the force.

27. The method of claim 26, wherein the anti-spoofing process is also based, at least in part, on at least one of a first fingerprint image corresponding to the first ultrasonic receiver signals or a second fingerprint image corresponding to the second ultrasonic receiver signals.

28. The method of claim 26, wherein the anti-spoofing process involves a process of estimating a target object material property.

29. The method of claim 19, further comprising estimating a first force corresponding to the first ultrasonic receiver signals and estimating a second force corresponding to the second ultrasonic receiver signals.

30. The method of claim 29, further comprising controlling at least one of a display or a speaker to provide a prompt to apply a different force after estimating the first force.

31. The method of claim 19, wherein the ultrasonic fingerprint sensor is integrated into a mobile device.

32. An apparatus, comprising:
an ultrasonic fingerprint sensor; and
control means for:
controlling the ultrasonic fingerprint sensor for transmission of first ultrasonic waves towards a target object in contact with a surface, the surface being an ultrasonic fingerprint sensor surface or a surface of a device proximate an area in which the ultrasonic fingerprint sensor resides;
receiving first ultrasonic receiver signals from the ultrasonic fingerprint sensor, the first ultrasonic receiver signals including signals corresponding to reflections of the first ultrasonic waves from the target object;
obtaining an estimation of a force applied by the target object on the surface;
determining at least one ultrasonic fingerprint sensor parameter modification based, at least in part, on the force;
updating at least one setting of the ultrasonic fingerprint sensor based, at least in part, on the ultrasonic fingerprint sensor parameter modification;
controlling the ultrasonic fingerprint sensor for transmission of second ultrasonic waves towards the target object;
receiving second ultrasonic receiver signals from the ultrasonic fingerprint sensor, the second ultrasonic receiver signals including signals corresponding to reflections of the second ultrasonic waves from the target object; and
performing an authentication process based, at least in part, on the first ultrasonic receiver signals and the second ultrasonic receiver signals.

33. The apparatus of claim 32, wherein the at least one ultrasonic fingerprint sensor parameter modification includes at least one of a gain value modification, a modification of a frequency of a transmitted ultrasonic wave, a range gate delay modification, a range gate window modification or a modification of a bias condition.

34. The apparatus of claim 32, wherein the apparatus is integrated into a mobile device.

35. One or more non-transitory media having software stored thereon, the software including instructions for performing a method of controlling an ultrasonic fingerprint sensor, the method comprising:
controlling the ultrasonic fingerprint sensor for transmission of first ultrasonic waves towards a target object in contact with a surface, the surface being an ultrasonic fingerprint sensor surface or a surface of a device proximate an area in which the ultrasonic fingerprint sensor resides;
receiving first ultrasonic receiver signals from the ultrasonic fingerprint sensor, the first ultrasonic receiver signals including signals corresponding to reflections of the first ultrasonic waves from the target object;
obtaining an estimation of a force applied by the target object on the surface;
determining at least one ultrasonic fingerprint sensor parameter modification based, at least in part, on the force;
updating at least one setting of the ultrasonic fingerprint sensor based, at least in part, on the ultrasonic fingerprint sensor parameter modification;
controlling the ultrasonic fingerprint sensor for transmission of second ultrasonic waves towards the target object;
receiving second ultrasonic receiver signals from the ultrasonic fingerprint sensor, the second ultrasonic receiver signals including signals corresponding to reflections of the second ultrasonic waves from the target object; and
performing an authentication process based, at least in part, on the first ultrasonic receiver signals and the second ultrasonic receiver signals.

36. The one or more non-transitory media of claim 35, wherein the at least one ultrasonic fingerprint sensor parameter modification includes at least one of a gain value modification, a modification of a frequency of a transmitted ultrasonic wave, a range gate delay modification, a range gate window modification or a modification of a bias condition.

* * * * *